(12) United States Patent
Miyamoto et al.

(10) Patent No.: US 12,499,105 B2
(45) Date of Patent: Dec. 16, 2025

(54) COMPUTER-READABLE RECORDING MEDIUM STORING INFORMATION PROCESSING PROGRAM, INFORMATION PROCESSING APPARATUS, AND INFORMATION PROCESSING SYSTEM

(71) Applicant: Fujitsu Limited, Kawasaki (JP)

(72) Inventors: Ryo Miyamoto, Kawasaki (JP);
Toshiyuki Yoshitake, Kawasaki (JP);
Kazuaki Nimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/805,848

(22) Filed: Aug. 15, 2024

(65) Prior Publication Data
US 2025/0086163 A1    Mar. 13, 2025

(30) Foreign Application Priority Data
Sep. 13, 2023 (JP) ................................ 2023-148117

(51) Int. Cl.
G06F 16/00    (2019.01)
G06F 16/23    (2019.01)
G06F 16/953   (2019.01)
G06F 16/958   (2019.01)

(52) U.S. Cl.
CPC ........ G06F 16/2365 (2019.01); G06F 16/953 (2019.01); G06F 16/958 (2019.01)

(58) Field of Classification Search
CPC .................................................. G06F 16/958
See application file for complete search history.

(56) References Cited

U.S. PATENT DOCUMENTS

2019/0114297 A1    4/2019   Xie
2020/0202071 A1    6/2020   Ghulati
2022/0164643 A1*   5/2022   Charnock ............. G06F 16/951

FOREIGN PATENT DOCUMENTS

JP    2009-122785       6/2009
JP    2011-507110       3/2011
WO    WO 2009/076555 A2  6/2009

OTHER PUBLICATIONS

European Search Report dated Dec. 3, 2024, in European Application No. EP 24 19 5841.
Eugenio Tacchini et al., "Some Like it Hoax: Automated Fake Detection in Social Networks", arXiv, Apr. 25, 2017, pp. 1-12, XP093224444.
European Office Action dated Oct. 8, 2025 for corresponding European Patent Application No. 24195841.2.

* cited by examiner

*Primary Examiner* — Ajith Jacob
(74) *Attorney, Agent, or Firm* — STAAS & HALSEY LLP

(57) ABSTRACT

A non-transitory computer-readable recording medium storing an information processing program for causing a computer to execute a process includes acquiring additional information capable of verifying reliability of a plurality of first Web articles, detecting the number of empathies that indicates the number of empathies given to the additional information when the additional information is regarded as valid for verification of the reliability, and ordering the plurality of first Web articles based on the number of empathies.

7 Claims, 23 Drawing Sheets

COMPUTER-READABLE RECORDING MEDIUM STORING INFORMATION PROCESSING PROGRAM, INFORMATION PROCESSING APPARATUS, AND INFORMATION PROCESSING SYSTEM

CROSS-REFERENCE TO RELATED APPLICATION

This application is based upon and claims the benefit of priority of the prior Japanese Patent Application No. 2023-148117, filed on Sep. 13, 2023, the entire contents of which are incorporated herein by reference.

FIELD

The embodiment discussed herein is related to an information processing program, an information processing apparatus, and an information processing system.

BACKGROUND

A keyword indicating a matter to be searched on a search screen is input and searched by using a search engine on the Internet, and data (Web article) published on the Web is acquired as a search result.

As related art, for example, a technique has been proposed that receives an input related to quality of content from a user other than an author of the content, about the content to be publicly disclosed online and determines a confidence coefficient of the content. Furthermore, a technique has been proposed that determines a translator to be an order destination based on an evaluation point weighted according to a commonality degree between identification information of a new translation requester and identification information of a translation request experienced person.

Moreover, a technique has been proposed that transmits a combined list of Web page entries generated from a page score of a Web page entry and a page score of a weighted friend Web page entry, to a terminal. Moreover, a technique has been proposed that determines a content score that reflects reliability verified for data input from a user.

Japanese National Publication of International Patent Application No. 2011-507110, Japanese Laid-open Patent Publication No. 2009-122785, U.S. Patent Application Publication No. 2019/0114297, and U.S. Patent Application Publication No. 2020/0202071 are disclosed as related art.

SUMMARY

According to an aspect of the embodiments, a non-transitory computer-readable recording medium storing an information processing program for causing a computer to execute a process includes acquiring additional information capable of verifying reliability of a plurality of first Web articles, detecting the number of empathies that indicates the number of empathies given to the additional information when the additional information is regarded as valid for verification of the reliability, and ordering the plurality of first Web articles based on the number of empathies.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

From a search result by a search engine on the Internet, correct and reliable information is not always obtained, and the search result may include erroneous information and fake news. Therefore, in recent years, an architecture has been developed that can acquire additional information to be the basis of certainty of a Web article on the Internet (reliability of Web article).

As a result, when a user views the Web article on the Internet, the user can verify and determine the reliability of the Web article by oneself, by acquiring the additional information of the Web article.

On the other hand, it takes effort for the user to verify the reliability of the Web article by oneself using such an architecture.

According to one aspect, an object of the embodiment is to provide an information processing program, an information processing apparatus, and an information processing system that can perform output based on reliability of a Web article.

Hereinafter, a present embodiment will be described with reference to the drawings.

Figure 1:
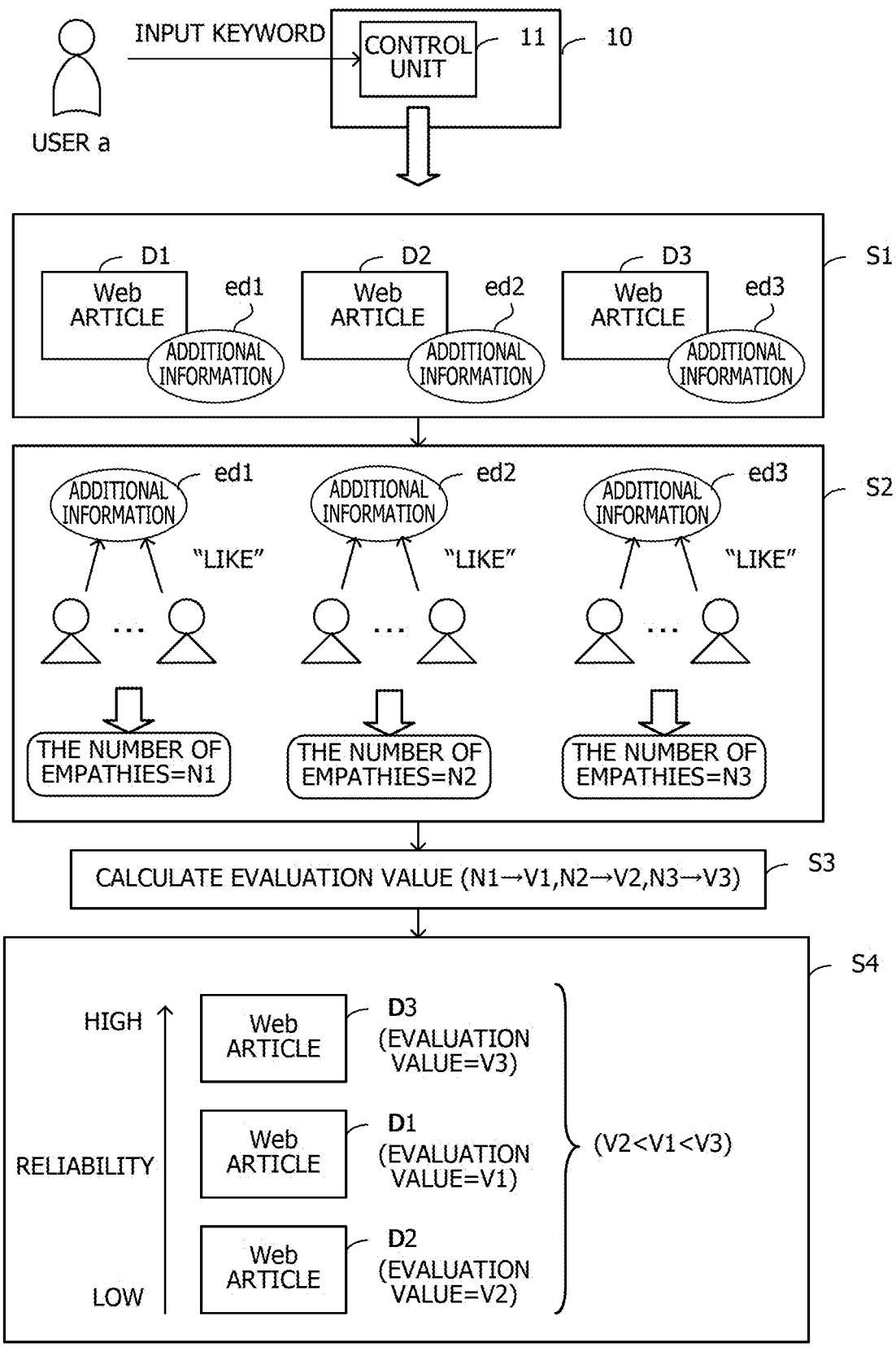
FIG. 1 is a diagram for explaining an example of an information processing apparatus.

FIG. 1 is a diagram for explaining an example of an information processing apparatus. An information processing apparatus 10 is a device that includes a control unit 11 and performs a Web search using the Internet or the like. Functions of the control unit 11 are implemented, for example, by a processor (not illustrated) included in the information processing apparatus 10 executing a predetermined program.

[Step S1] The control unit 11 acquires Web articles D1, D2, and D3 by a search based on a keyword, input by a user a, used to search for Web articles. Furthermore, the control unit 11 acquires additional information ed1, ed2, and ed3 respectively associated with the Web articles D1, D2, and D3.

Here, the additional information is information that can verify reliability of the Web article. For example, it is assumed that article content of "occurrence of flood" be described in a Web article and "water level of river" be associated with the Web article as the additional information. In this case, a viewer of the Web article can verify, by oneself, reliability of "occurrence of flood" described in the Web article, from signature information given to the additional information "water level of river".

The additional information ed1 is information that can verify reliability of the Web article D1. Similarly, the additional information ed2 is information that can verify reliability of the Web article D2, and the additional information ed3 is information that can verify reliability of the Web article D3.

[Step S2] The control unit 11 detects the number of empathies that is the number of empathies ("like") given to the additional information. The empathy is given, for example, by a viewer of a Web article (Internet user or the like), when the additional information is regarded to be valid for verification of the reliability.

The control unit 11 detects the number of empathies N1 of an empathy given by the Internet user or the like, to the additional information ed1 that can verify the reliability of the Web article D1.

Similarly, the control unit 11 detects the number of empathies N2 of an empathy given to the additional information ed2 that can verify the reliability of the Web article D2 and detects the number of empathies N3 of an empathy given to the additional information ed3 that can verify the reliability of the Web article D3.

[Step S3] The control unit 11 calculates an evaluation value of the reliability of each of the Web articles D1 to D3 from the number of empathies. It is assumed that an evaluation value V1 be calculated from the number of empathies N1, an evaluation value V2 be calculated from the number of empathies N2, and an evaluation value V3 be calculated from the number of empathies N3.

[Step S4] The control unit 11 orders (for example, rearrange) the Web articles D1 to D3 based on the evaluation values. For example, in a case where magnitudes of the evaluation values are V2<V1<V3, the Web article D3 has the highest reliability of the article content among the Web articles D1 to D3, and the Web article D1 has the second highest reliability, and the Web article D2 has the lowest reliability.

Therefore, the control unit 11 rearranges the Web articles D1 to D3 as the Web articles D3, D1, and D2 in descending order of the evaluation value (reliability), based on the evaluation values of the reliability. Furthermore, the control unit 11 can display the rearranged Web articles D3, D1, and D2 on a screen.

In this way, the information processing apparatus 10 acquires the additional information that can verify the reliability of the article content, associated with the Web article, to the searched Web article and orders the Web articles based on the number of empathies given to the additional information. As a result, it is possible to output based on the reliability of the Web article.

Furthermore, the information processing apparatus 10 can calculate the evaluation value of the reliability of the Web article based on the number of empathies given to the additional information and order the Web articles based on the evaluation values. As a result, in a case where the user performs a search using a search engine, without verifying the reliability of the Web article by oneself, it is possible to more accurately perform output such as screen display, based on the reliability of the Web article.

Trustable Internet

Next, Trustable Internet that enables to acquire additional information to be the basis of the reliability of the Web article on the Internet will be described.

Figure 2:
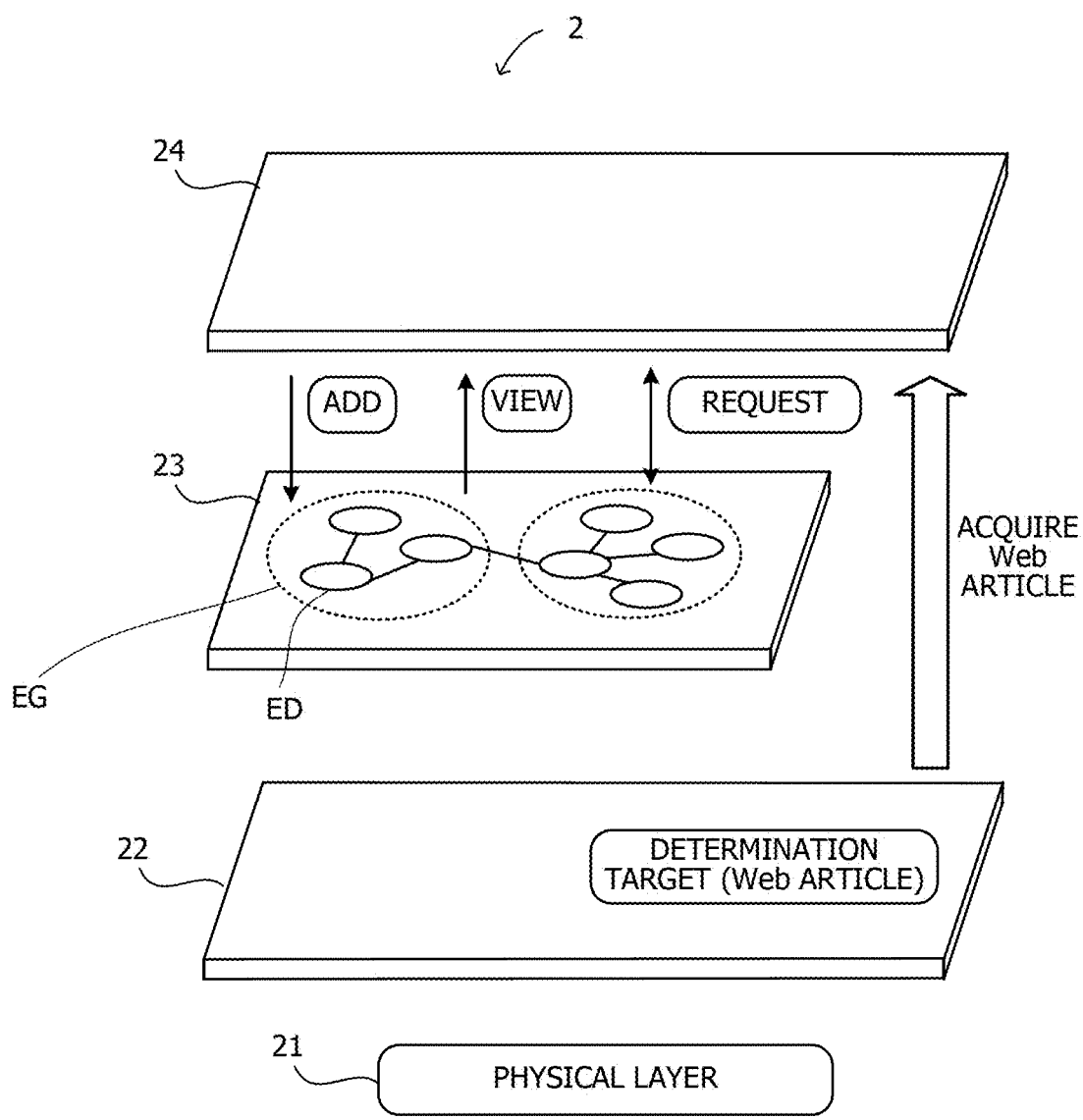
FIG. 2 is a diagram illustrating an example of an architecture of Trustable Internet.

FIG. 2 is a diagram illustrating an example of an architecture of the Trustable Internet. Trustable Internet 2 has an architecture in which a layer called an Endorsement Layer (endorsement layer) is added between an Internet layer 22 above a physical layer 21 and a Web/application layer 24.

The additional information to be the basis of the reliability of the Web article is called Endorsement Data (endorsement data), and the endorsement layer 23 has a function of managing endorsement data ED.

In the endorsement layer 23, the endorsement data ED added at any timing from the user is associated and connected to be accumulated on the endorsement layer 23 as graph data (endorsement graph EG).

The user can view connection of the endorsement data via the endorsement graph EG, with respect to a Web article to be a reliability determination target. Moreover, when the user acquires the Web article on the Internet, the endorsement data ED can be searched and confirmed from the endorsement layer 23. Alternatively, the user can verify and determine, by oneself, the reliability of the Web article that the user desires to acquire, by requesting the endorsement data ED necessary for determining the reliability by the user.

Endorsement Data

Figure 3:
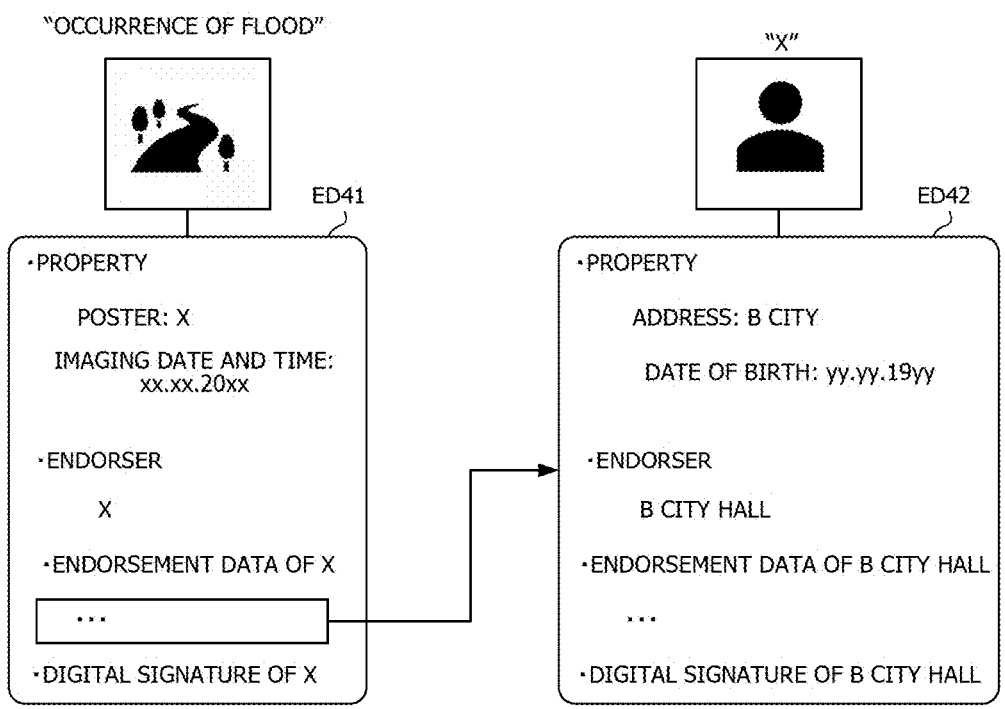
FIG. 3 is a diagram illustrating an example of endorsement data.

FIG. 3 is a diagram illustrating an example of the endorsement data. The endorsement data is data in which information regarding a Web article on the Internet or information regarding an individual, a corporation, a device, or the like is recorded in an unfalsifiable form by a digital signature.

In the example in FIG. 3, endorsement data ED41 of a Web article "occurrence of flood" and endorsement data ED42 of an identity of an individual, corporation, device, or the like that has given the endorsement data ED41 are illustrated.

In the endorsement data, information to be the basis of the reliability of the Web article on the Internet is treated as "Property (property)". It is assumed that the property express article data of the Web article or an attribute or a function of the individual, the corporation, the device, or the like. For example, for the endorsement data ED41 of the Web article "occurrence of flood", a poster: X and an imaging date and time: 20xx. xx. xx correspond to the properties.

The property is one of the pieces of the information to be the basis of the reliability of the Web article for the viewer of the Web article. Furthermore, an individual, a corporation, a device, or the like that has generated the property and issued the endorsement data is referred to as an Endorser (endorser).

In this example, an endorser who has generated the property related to the Web article "occurrence of flood" is X who is a sender. Furthermore, the endorsement data ED42 related to X is associated with the endorsement data ED41.

In the endorsement data ED42, an address of X: B city and a date of birth: 19yy.yy.yy are set as properties, and in addition, an issuer of the endorsement data ED42 that has generated the property is set to B city hall that is a local government to which X belongs.

By giving such endorsement data to the Web article on the Internet, the viewer of the Web article can confirm a creator, a creation place, or the like of the Web article, and determine the reliability of the Web article from the endorsement data. Furthermore, since identification information of the individual, the corporation, the device (measurement value of sensor or the like), or the like that has given the endorsement data is expressed by the endorsement data, the viewer can determine the reliability of the Web article from such identification information.

Endorsement Graph

Figure 4:
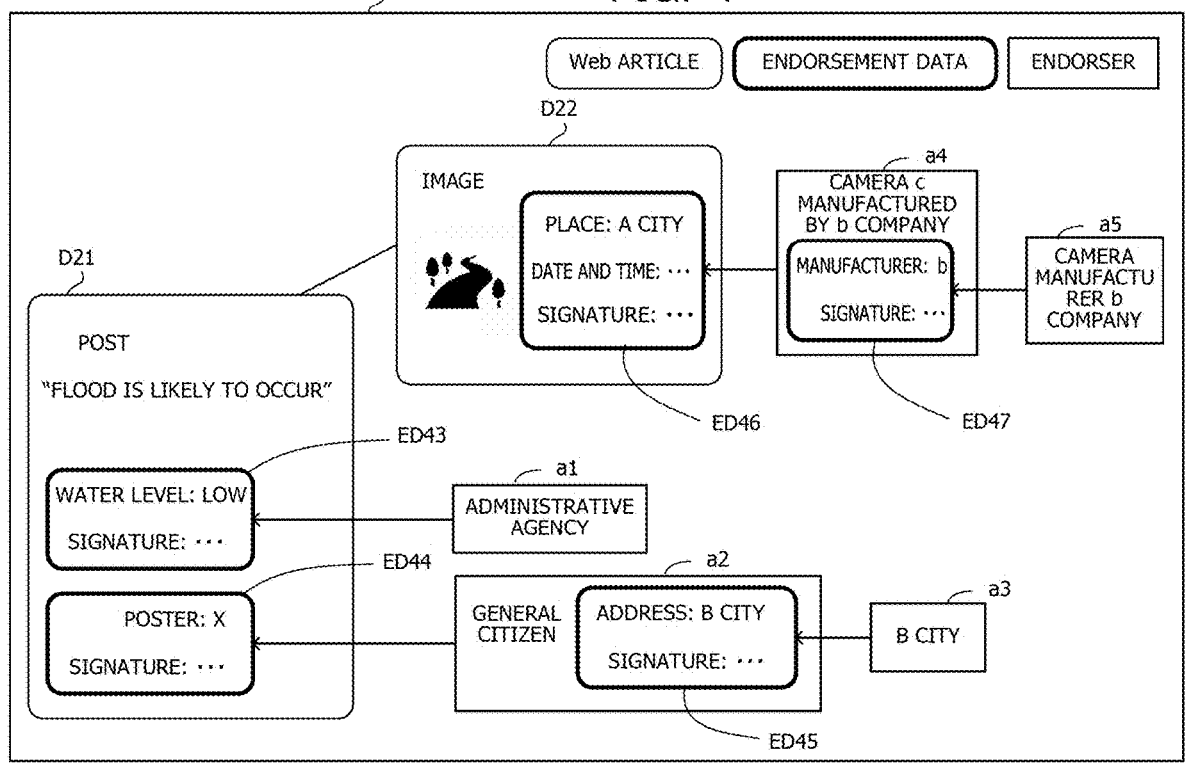
FIG. 4 is a diagram illustrating an example of an endorsement graph.

FIG. 4 is a diagram illustrating an example of an endorsement graph. The endorsement graph EG expresses the Web article to be target data of which the reliability is determined, the endorsement data to be the basis of the determination of the reliability, and the endorser that has issued the endorsement data, as a graph.

In this example, an example of an endorsement graph EG created for a Web article D21 "flood is likely to occur" posted from a general citizen and a Web article D22 including a posted image in which a state of a river is imaged is illustrated. Note that, hereinafter, there is a case where the digital signature is simply referred to as a signature.

Here, endorsement data ED43 "water level: low" is attached to the Web article D21 describing that "flood is likely to occur", and an endorser a1 "administrative agency" is connected to the endorsement data ED43.

Furthermore, endorsement data ED44 of "poster: X" is attached to the Web article D21, and an endorser a2 "general citizen" is connected to the endorsement data ED44. Moreover, endorsement data ED45 of "address: B city" is attached to the endorser a2, and an endorser a3 of "B city" is connected to the endorsement data ED45.

On the other hand, endorsement data ED46 of "place: A city, date and time: . . . " is attached to the Web article D22 of the river image related to the Web article D21, and an endorser a4 of "camera c manufactured by b company" is connected to the endorsement data ED46. Moreover, endorsement data ED47 of "manufacturer: b" is attached to the endorser a4, and an endorser a5 of "camera manufacturer b" is connected to the endorsement data ED47.

According to such an endorsement graph EG, the viewer of the Web articles D21 and D22 can recognize that the posted image of the Web article D22 is imaged at a place different from a residence of the poster X and that data contrary to the posted content from the administrative agency is provided. Thus, the viewer can determine that the Web article D21 is not trustworthy.

In the Trustable Internet 2, in this way, the user can share the endorsement graph obtained by graphing the endorsement data (additional information). Then, it is possible to acquire and view the endorsement data to be the basis of the reliability of the Web article as necessary, while using the existing Internet, and it is possible to determine authenticity of the data by oneself.

In a case where the search is performed by the search engine without requiring the user to verify the reliability of the data by oneself, using the Trustable Internet 2 described above, the present embodiment enables to acquire the Web articles ordered according to the reliability.

System Configuration

Figure 5:
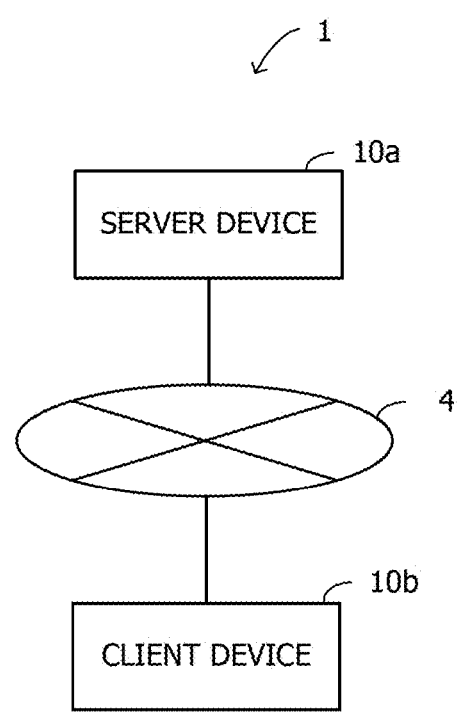
FIG. 5 is a diagram illustrating an example of a configuration of an information processing system.

FIG. 5 is a diagram illustrating an example of a configuration of an information processing system. An information processing system 1 includes a server device 10a and a client device 10b, and the server device 10a and the client device 10b are coupled by a network 4.

Here, in FIG. 1 above, the information processing apparatus 10 serves as a device that receives an input search keyword, executes processing from step S1 to step S4, and displays the ordered Web articles.

On the other hand, in the information processing system 1, the client device 10b serves as a device that receives the input search keyword, displays the ordered Web articles, and on which the Web article is viewed, and the server device 10a serves as a device that executes the processing from step S1 to step S4. Furthermore, fact check of the Web article may be performed by the client device 10b. The functions of the embodiment can include such a system.

Functional Blocks

Figure 6:
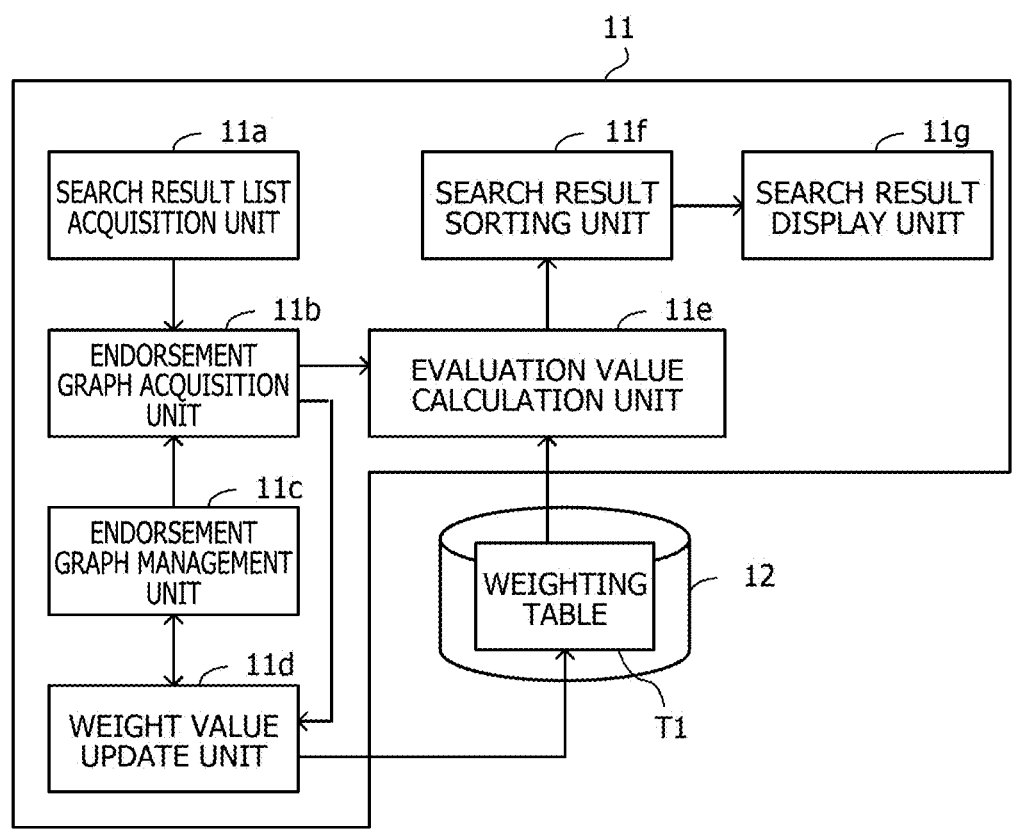
FIG. 6 is a diagram illustrating an example of a functional block of the information processing apparatus.

FIG. 6 is a diagram illustrating an example of a functional block of the information processing apparatus. The control unit 11 includes a search result list acquisition unit 11a, an endorsement graph acquisition unit 11b, an endorsement graph management unit 11c, a weight value update unit 11d, an evaluation value calculation unit 11e, a search result sorting unit 11f, and a search result display unit 11g. Furthermore, the information processing apparatus 10 includes a storage unit 12, and a weighting table T1 is stored in the storage unit 12.

The search result list acquisition unit 11a receives an input of a keyword from the user, searches for a Web article according to the input keyword, and acquires a Web article list that is a search result. The endorsement graph acquisition unit 11b acquires an endorsement graph of the designated Web article. The endorsement graph management unit 11c manages the endorsement graph.

The weight value update unit 11d sets and updates a weight value, when the evaluation value of the reliability of the Web article is calculated from the number of empathies. The evaluation value calculation unit 11e refers to the weighting table T1, weights the number of acquired empathies, and calculates the evaluation value of the Web article. The search result sorting unit 11f orders the plurality of Web articles, based on the calculated evaluation value. The search result display unit 11*g* displays the ordered Web articles on the screen.

Hardware

Figure 7:
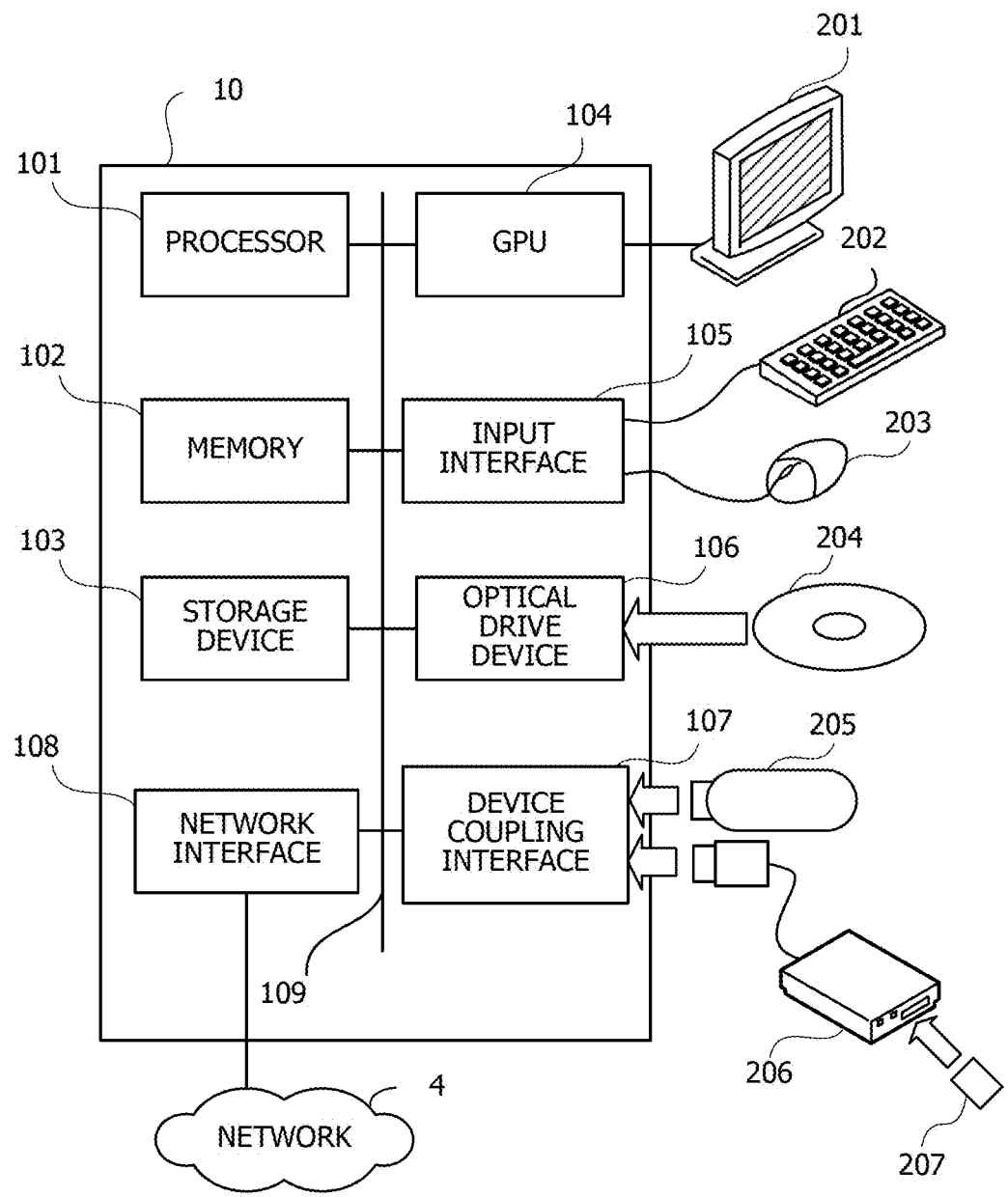
FIG. 7 is a diagram illustrating an example of a configuration of hardware of the information processing apparatus.

FIG. 7 is a diagram illustrating an example of a configuration of hardware of the information processing apparatus. The entire information processing apparatus 10 is controlled by a processor 101 having the functions of the control unit 11. A memory 102 and a plurality of peripheral devices are coupled to the processor 101 via a bus 109. The processor 101 may be a multiprocessor. The processor 101 is, for example, a central processing unit (CPU), a micro processing unit (MPU), or a digital signal processor (DSP). At least a part of functions implemented by the processor 101 executing a program may be implemented by an electronic circuit such as an application specific integrated circuit (ASIC) or a programmable logic device (PLD).

The memory 102 is used as a main storage device of the information processing apparatus 10. The memory 102 temporarily stores at least a part of operating system (OS) programs and application programs to be executed by the processor 101. Furthermore, the memory 102 stores various types of data to be used in processing by the processor 101. As the memory 102, for example, a volatile semiconductor storage device such as a random access memory (RAM) is used.

Examples of the peripheral devices coupled to the bus 109 include a storage device 103, a graphics processing unit (GPU) 104, an input interface 105, an optical drive device 106, a device coupling interface 107, and a network interface 108.

The storage device 103 has the function of the storage unit 12 and electrically or magnetically writes/reads data in/from a built-in recording medium. The storage device 103 is used as an auxiliary storage device of the information processing apparatus 10. In the storage device 103, OS programs, application programs, and various types of data are stored. Note that, as the storage device 103, for example, a hard disk drive (HDD) or a solid state drive (SSD) may be used.

The GPU 104 is an arithmetic device that executes image processing, and is also referred to as a graphic controller. A display 201 is coupled to the GPU 104. The GPU 104 causes a screen of the display 201 to display an image according to an instruction from the processor 101. Examples of the display 201 include a display device using an organic electro luminescence (EL), a liquid crystal display device, and the like.

A keyboard 202 and a mouse 203 are coupled to the input interface 105. The input interface 105 transmits signals sent from the keyboard 202 and the mouse 203 to the processor 101. Note that the mouse 203 is an example of a pointing device, and another pointing device may also be used. Examples of the another pointing device include a touch panel, a tablet, a touch pad, a track ball, and the like.

The optical drive device 106 uses laser light or the like to read data recorded in an optical disk 204 or write data to the optical disk 204. The optical disk 204 is a portable recording medium in which data is recorded in a manner readable by reflection of light. Examples of the optical disk 204 include a digital versatile disc (DVD), a DVD-RAM, a compact disc read only memory (CD-ROM), a CD-recordable (R)/rewritable (RW), and the like.

The device coupling interface 107 is a communication interface for coupling the peripheral device to the information processing apparatus 10. For example, a memory device 205 and a memory reader/writer 206 may be coupled to the device coupling interface 107. The memory device 205 is a recording medium equipped with a communication function with the device coupling interface 107. The memory reader/writer 206 is a device that writes data to a memory card 207 or reads data from the memory card 207. The memory card 207 is a card-type recording medium.

The network interface 108 is coupled to the network 4. The network interface 108 exchanges data with another computer or communication device via the network 4. The network interface 108 is, for example, a wired communication interface coupled to a wired communication device such as a switch or a router with a cable. Furthermore, the network interface 108 may be a wireless communication interface that is coupled to and communicates with a wireless communication device such as an access point with radio waves.

The information processing apparatus 10 can implement processing functions of the embodiment, by the hardware described above. The information processing apparatus 10 executes a program recorded in a computer-readable recording medium, for example, thereby implementing the processing functions of the embodiment. The programs in which processing content to be executed by the information processing apparatus 10 are written may be recorded in various recording media.

For example, a program to be executed by the information processing apparatus 10 may be stored in the storage device 103. The processor 101 loads at least a part of the program in the storage device 103 into the memory 102 and executes the program. Furthermore, it is also possible to record the program to be executed by the information processing apparatus 10 in a portable recording medium such as the optical disk 204, the memory device 205, or the memory card 207. The program stored in the portable recording medium may be executed after being installed in the storage device 103 under control of the processor 101, for example. Furthermore, the processor 101 may also read the program directly from the portable recording medium to execute the program.

Acquisition of Data from Endorsement Data

Figure 8:
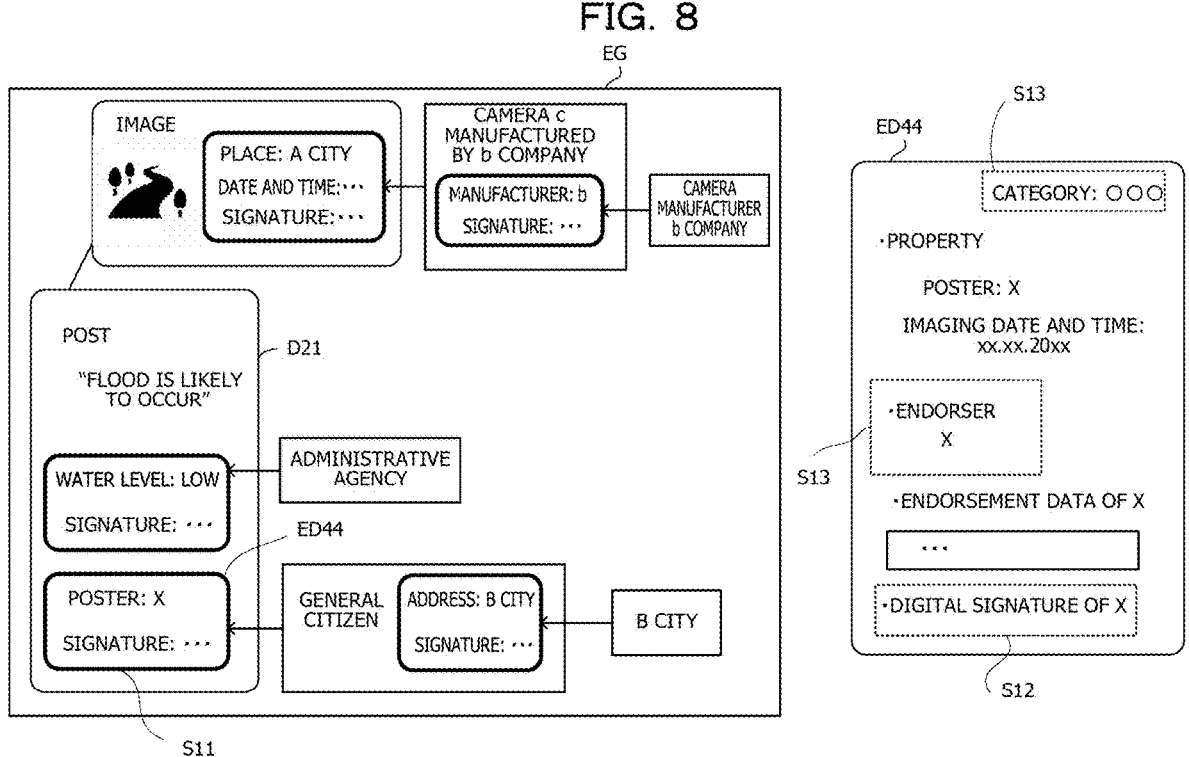
FIG. 8 is a diagram illustrating an example of an operation of acquiring information from the endorsement data.

FIG. 8 is a diagram illustrating an example of an operation of acquiring information from the endorsement data. For example, a case will be described where information regarding the endorser and a category of the Web article are acquired as the information to be acquired from the endorsement data.

[Step S11] The control unit 11 acquires data of poster: X, as a part of the endorsement data ED44 from the endorsement graph EG of the Web article D21.

[Step S12] The control unit 11 verifies a digital signature of the acquired data.

[Step S13] After confirming that the verification of the digital signature is successful, the control unit 11 acquires the information regarding the user (endorser) who has given the endorsement data ED44 and the information regarding the category of the Web article D21, from the acquired endorsement data ED44.

Search Operation

Figure 9:
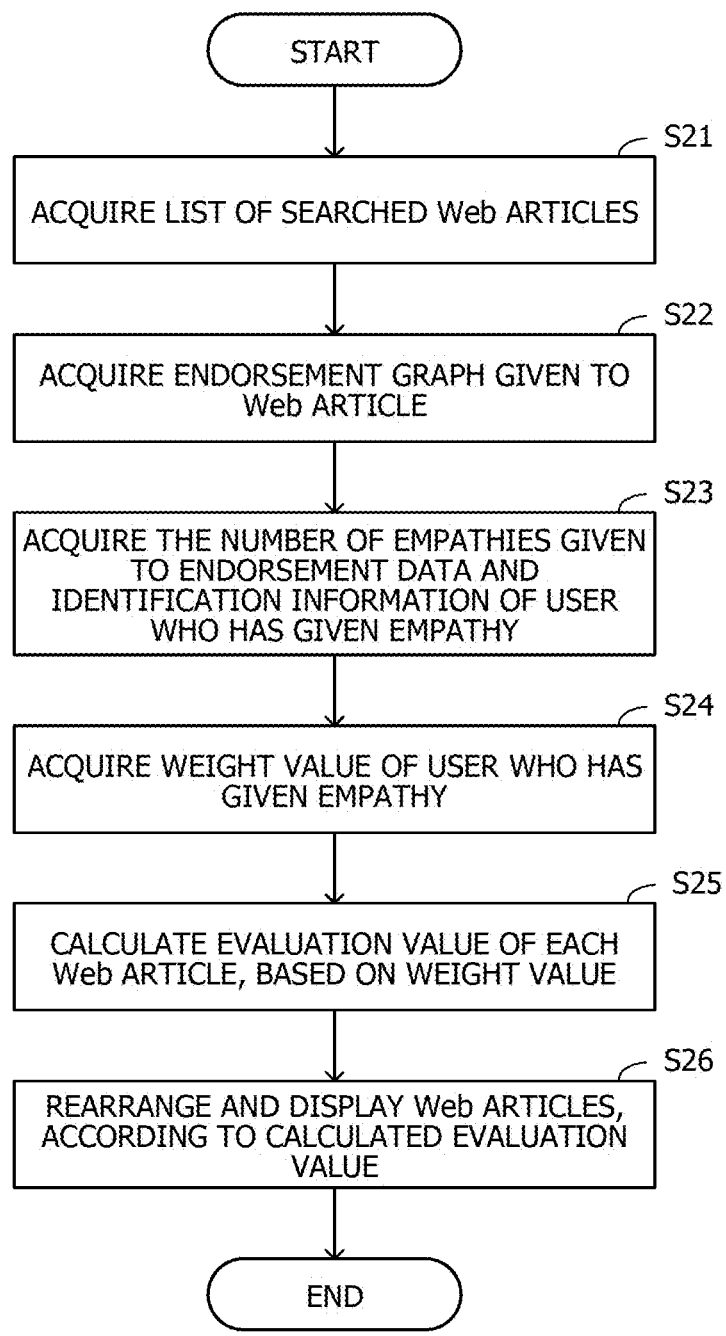
FIG. 9 is a flowchart illustrating an example of a Web article search operation.

FIG. 9 is a flowchart illustrating an example of a Web article search operation.

[Step S21] In a case where a keyword indicating a matter desired to be searched on a search screen is input by the user and a search operation is performed, the control unit 11 acquires a list of the searched Web articles.

[Step S22] The control unit 11 acquires an endorsement graph given to the Web article, for each Web article included in the acquired Web article list.

[Step S23] The control unit 11 acquires the number of empathies given to the endorsement data in the acquired endorsement graph and identification information of the user who has given the empathy.

[Step S24] The control unit 11 acquires weight values (first weight value and second weight value) set to the user who has given the empathy, based on the weighting table T1.

[Step S25] The control unit 11 weights the number of empathies based on the first weight value and the second weight value and calculates the evaluation value of the reliability of each Web article. In a case of calculating the weighted number of empathies weighted based on the first weight value and the second weight value, the control unit 11 calculates the number of empathies using the following formula (1), for example. Note that constants C1 and C2 in the formula (1) are preset values.

$$\text{Weighted number of empathies} = \text{the number of empathies} + (\text{first weight value } w1 \times \text{constant } C1 + \text{second weight value } w2 \times \text{constant } C2) \div 2 \quad (1)$$

[Step S26] The control unit 11 orders the Web articles according to the calculated evaluation values and displays the Web articles as a search result on the screen.

Calculation of Evaluation Value and Rearrangement of Web Articles

Figure 10:
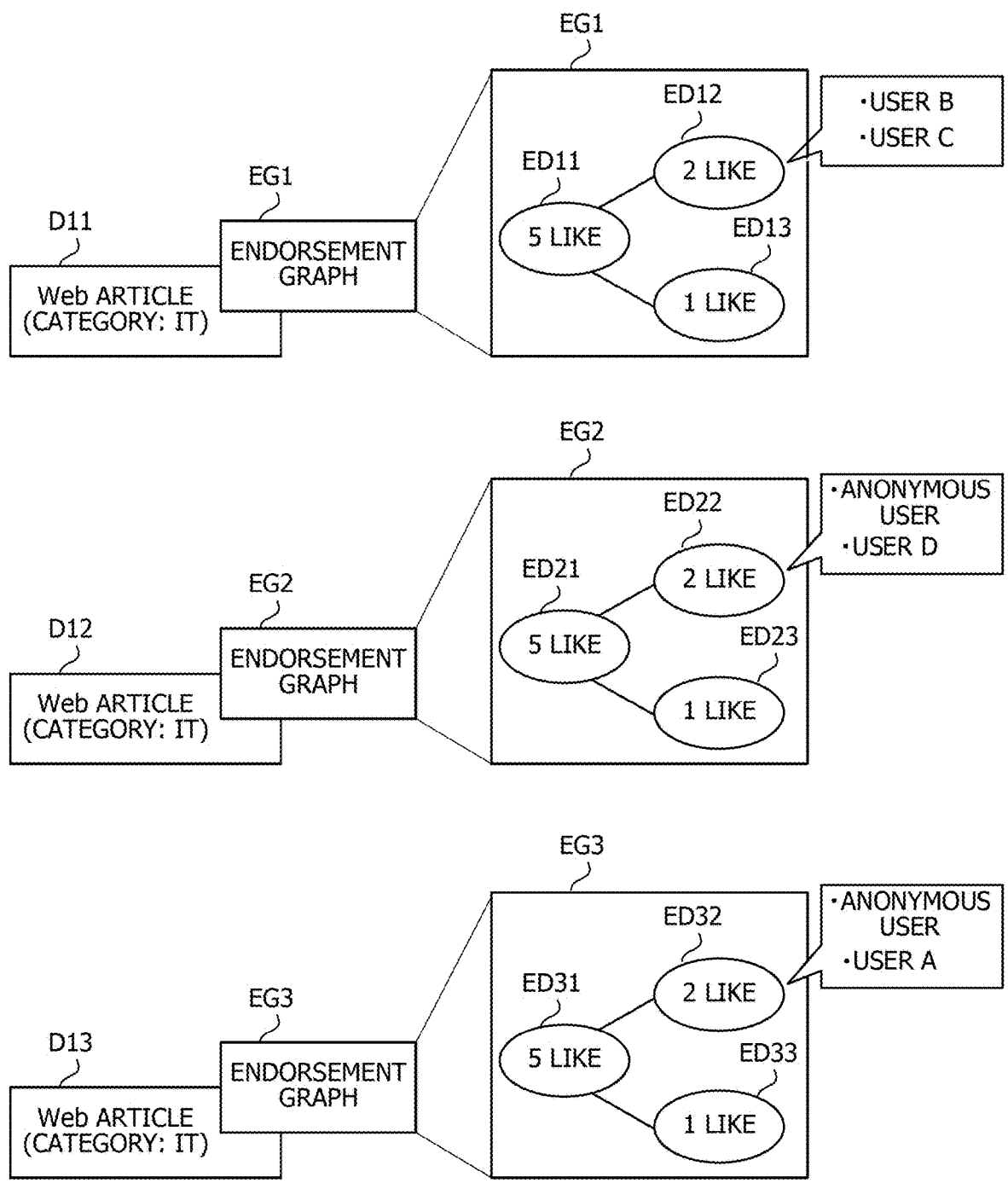
FIG. 10 is a diagram illustrating an example of a state where an empathy is given to the endorsement data.

Next, calculation of the evaluation value and rearrangement of the Web articles are described with reference to FIGS. 10 to 12. FIG. 10 is a diagram illustrating an example of a state where an empathy is given to the endorsement data. It is assumed that the control unit 11 acquire Web articles D11, D12, and D13, in response to a search operation of the user. Furthermore, to the Web article to be searched, a category used to classify article content is given. The Web articles D11 to D13 in FIG. 10 are articles regarding information technology (IT), and a category is IT.

An endorsement graph EG1 is given to the Web article D11. The endorsement graph EG1 includes endorsement data ED11, ED12, and ED13, and the endorsement data ED11, ED12, and ED13 are graphed.

Furthermore, five empathies ("like") are given to the endorsement data ED11, two empathies are given to the endorsement data ED12, and one empathy is given to the endorsement data ED13. Note that one of the two empathies of the endorsement data ED12 is given by a user B, and another empathy is given by a user C.

To the Web article D12, an endorsement graph EG2 is given. The endorsement graph EG2 includes endorsement data ED21, ED22, and ED23, and the endorsement data ED21, ED22, and ED23 are graphed.

Furthermore, five empathies are given to the endorsement data ED21, two empathies are given to the endorsement data ED22, and one empathy is given to the endorsement data ED23. Note that, one of the two empathies of the endorsement data ED22 is given by an anonymous user, and another empathy is given by a user D.

To the Web article D13, an endorsement graph EG3 is given. The endorsement graph EG3 includes endorsement data ED31, ED32, and ED33, and the endorsement data ED31, ED32, and ED33 are graphed.

Furthermore, five empathies are given to the endorsement data ED31, two empathies are given to the endorsement data ED32, and one empathy is given to the endorsement data ED33. Note that, one of the two empathies of the endorsement data ED32 is given by an anonymous user, and another empathy is given by a user A.

Figure 11:
FIG. 11 is a diagram illustrating an example of a weighting table.

FIG. 11 is a diagram illustrating an example of a weighting table. The weighting table T1 includes items of a user (identification information of user), a category, a first weight value $w1$, and a second weight value $w2$.

In the weighting table T1, it is indicated that, in a case where the user A has given an empathy to endorsement data included in a Web article including content related to IT, the number of empathies of the user A is calculated by the first weight value $w1$ and the second weight value $w2$.

Furthermore, it is indicated that, in a case where the user B has given an empathy to endorsement data included in a Web article including content related to sports, the number of empathies of the user B is calculated by the first weight value $w1$ and the second weight value $w2$. The same applies to the users C and D.

Here, in the Web article D11, the empathies are given to the endorsement data ED12, by the users B and C registered in the weighting table T1. However, it is indicated that, from the weighting table T1, the number of empathies of the user B based on the weight value is calculated in a case where the category is sports, and the number of empathies of the user C based on the weight value is calculated in a case where the category is medical.

Therefore, since the category of the Web article D11 is IT, an evaluation value is calculated without using the weight value. In this case, the sum of the number of empathies is obtained, and the evaluation value of the Web article D11 is 8 (=5+2+1).

In the Web article D12, the empathies are given to the endorsement data ED22 by the anonymous user and the user D registered in the weighting table T1. From the weighting table T1, it is indicated that the number of empathies of the user D is weighted based on the first weight value $w1$ and the second weight value $w2$ in a case where the category is IT, and the first weight value $w1=1$, and the second weight value $w2=2$.

Therefore, the weighted number of empathies of the user D is calculated by the formula (1). In a case where the constant C1=1 and the constant C2=1, the weighted number of empathies of the user D=1+(1×1+2×1)÷2=2.5. Therefore, the evaluation value of the Web article D12 is 8.5(=5+2.5+1).

In the Web article D13, the empathies are given to the endorsement data ED32 by the anonymous user and the user A registered in the weighting table T1. From the weighting table T1, it is indicated that the number of empathies of the user A is weighted based on the first weight value $w1$ and the second weight value $w2$ in a case where the category is IT, and the first weight value $w1=3$, and the second weight value $w2=1$.

Therefore, the weighted number of empathies of the user A is calculated by the formula (1). In a case where the constant C1=the constant C2=1, the weighted number of empathies of the user A=1+(3×1+1×1)÷2=3. Therefore, the evaluation value of the Web article D13 is 9 (=5+3+1).

Figure 12:
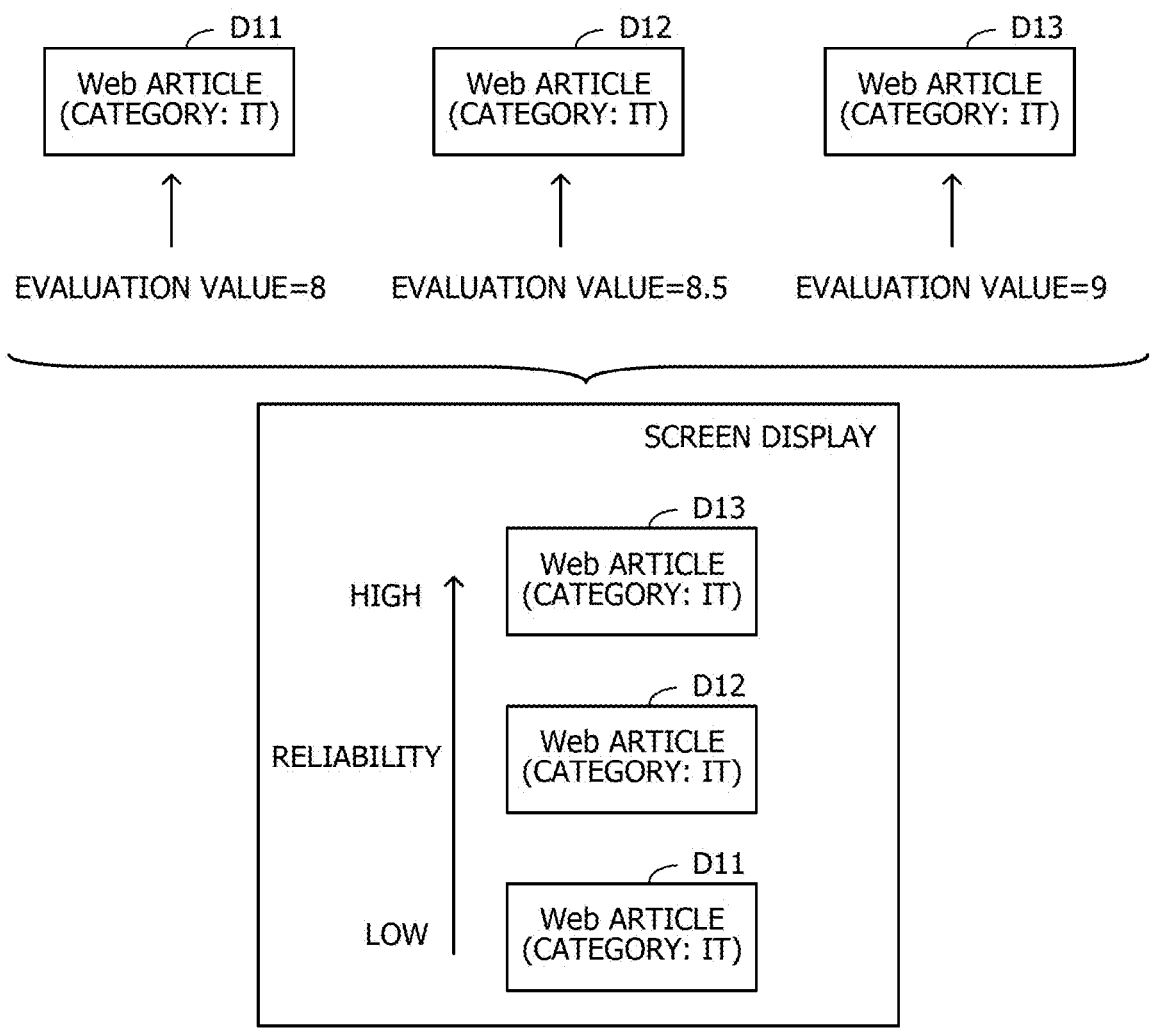
FIG. 12 is a diagram illustrating an example of display after Web articles are rearranged.

FIG. 12 is a diagram illustrating an example of display after Web articles are rearranged. As described above, the evaluation value of the Web article D11 is eight, the evaluation value of the Web article D12 is 8.5, and the evaluation value of the Web article D13 is nine. Therefore, in the search screen, the Web articles are rearranged in descending order of the evaluation value, and for example, the Web article D13, the Web article D12, and the Web article D11 are displayed in order from the top of the screen.

In this way, when the evaluation value is calculated, by calculating the evaluation value by weighting not only the number of empathies but also an empathy given by a specific user, it is possible to enhance accuracy of the evaluation value indicating the reliability of the Web article.

First Weight Value

Figure 13:
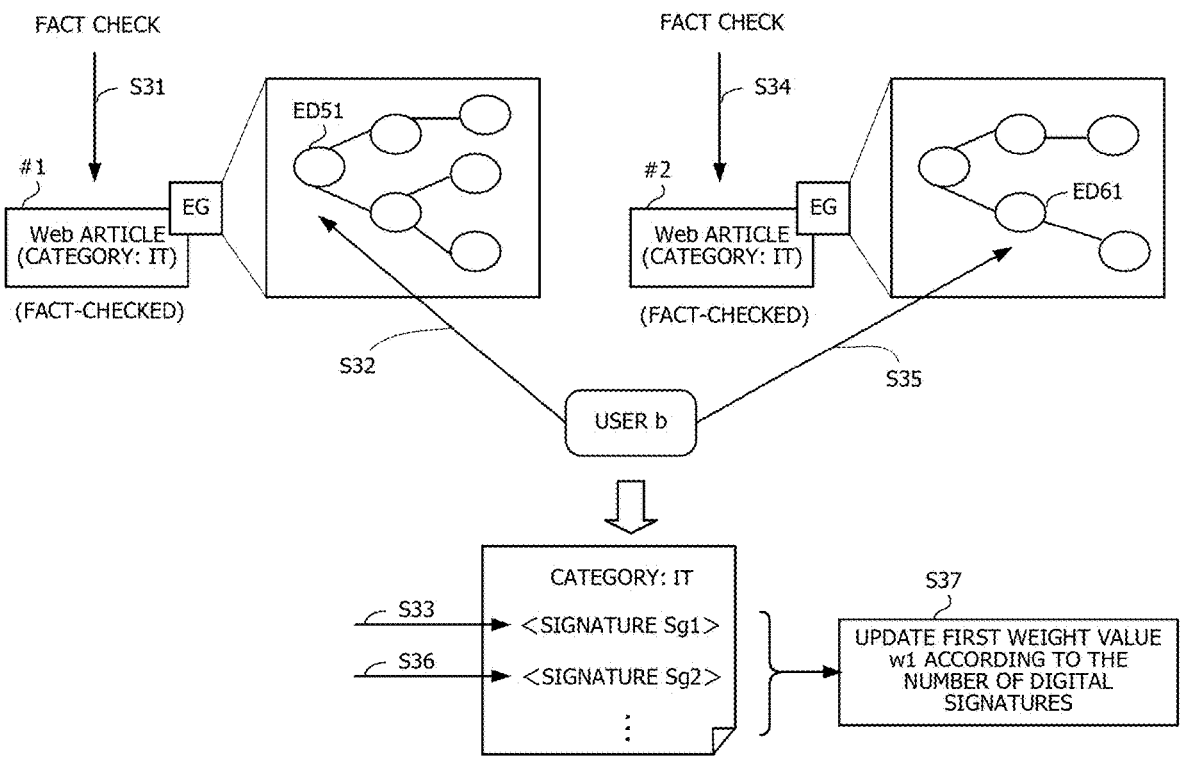
FIG. 13 is a diagram for explaining update of a first weight value.

Next, the first weight value w1 will be described with reference to FIGS. 13 and 14. FIG. 13 is a diagram for explaining update of the first weight value.

[Step S31] Fact check (true-false verification of article content) is performed by a third party or the like, on a Web article #1 of which a category is IT.

[Step S32] Endorsement data ED51 is given by a user b, to the Web article, on which the fact check has been performed, determined to be true (hereinafter, may be referred to as fact-checked Web article) (EG in FIG. 13 represents endorsement graph).

[Step S33] The control unit 11 (or executor of fact check on Web article #1) gives a digital signature Sg1 to the user b who gives the endorsement data ED51 to the fact-checked Web article.

[Step S34] The fact check is performed by a third party or the like, on a Web article #2 of which a category is IT. Although the category of the Web article #2 is IT, for example, article content is different from that of the Web article #1.

[Step S35] Endorsement data ED61 is given by the user b, to the fact-checked Web article #2.

[Step S36] The control unit 11 (or executor of fact check on Web article #2) gives a digital signature Sg2 to the user b who gives the endorsement data ED61 to the fact-checked Web article #2.

In this way, a digital signature to be a testament (hereinafter, may be referred to as specific digital signature) is given to the user who gives the endorsement data to the fact-checked Web article.

[Step S37] The control unit 11 updates the first weight value w1 of which the identification information is the user b and the category corresponds to IT, for the weighting table T1, according to the number of digital signatures given to the user b.

Figure 14:
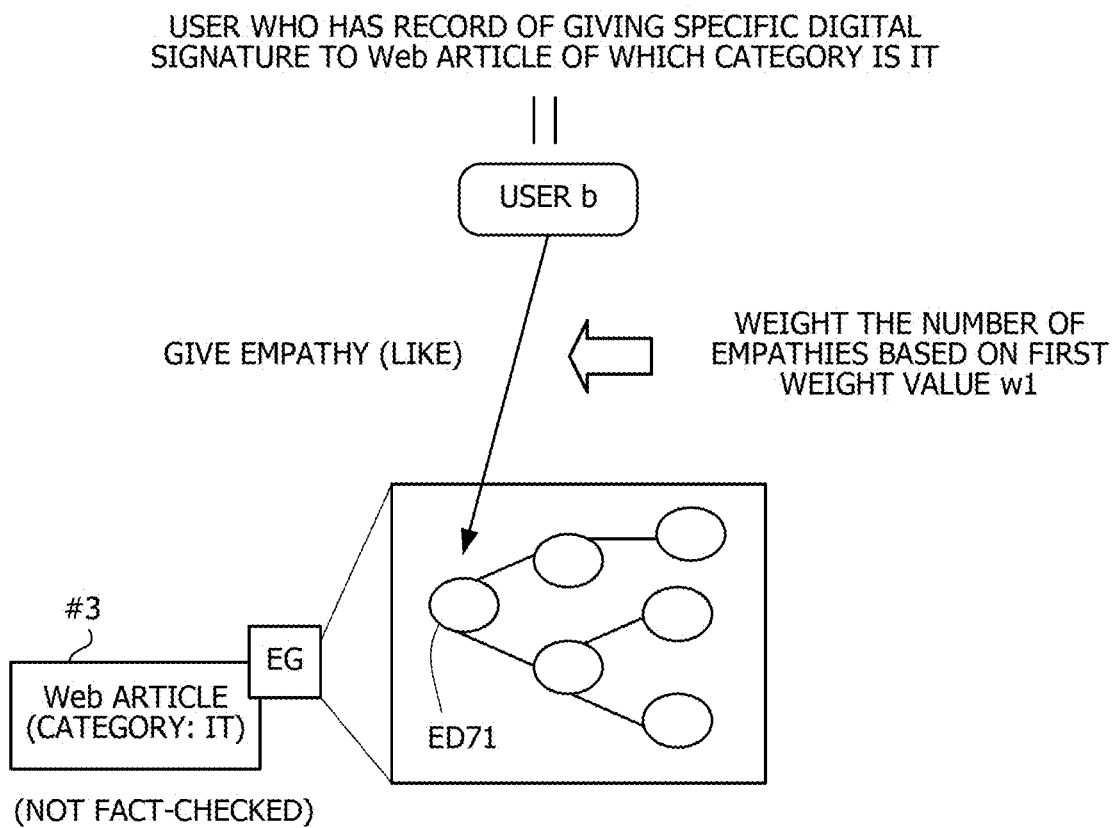
FIG. 14 is a diagram for explaining weighting to the number of empathies with the first weight value.

FIG. 14 is a diagram for explaining weighting to the number of empathies with the first weight value. The user b is a person who has a record indicating that the user b has given the endorsement data to the fact-checked Web article (category is IT), and a specific digital signature indicating the record is given to the person.

For example, it is assumed that such a user b give an empathy to endorsement data ED71 of a Web article #3 of which a category is IT and on which the fact check is not performed. In this case, weighting based on the first weight value w1 is performed on the number of empathies.

Here, it is assumed that the user b to whom the specific digital signature is given give an empathy to endorsement data included a Web article of which a category is IT and on which the fact check is not performed. In this case, it can be said that the empathy given by the user b has reliability higher than an empathy given to endorsement data included in Web article of which the category is the same IT, by a user b to whom the specific digital signature is not given.

Therefore, the number of empathies of empathy given by a user having a specific digital signature of a Web article in a certain category Ct, to a Web article in the same category Ct is weighted based on the first weight value w1, and at the time when the evaluation value is calculated, the weighted number of empathies based on the first weight value w1 is used.

Figure 15:
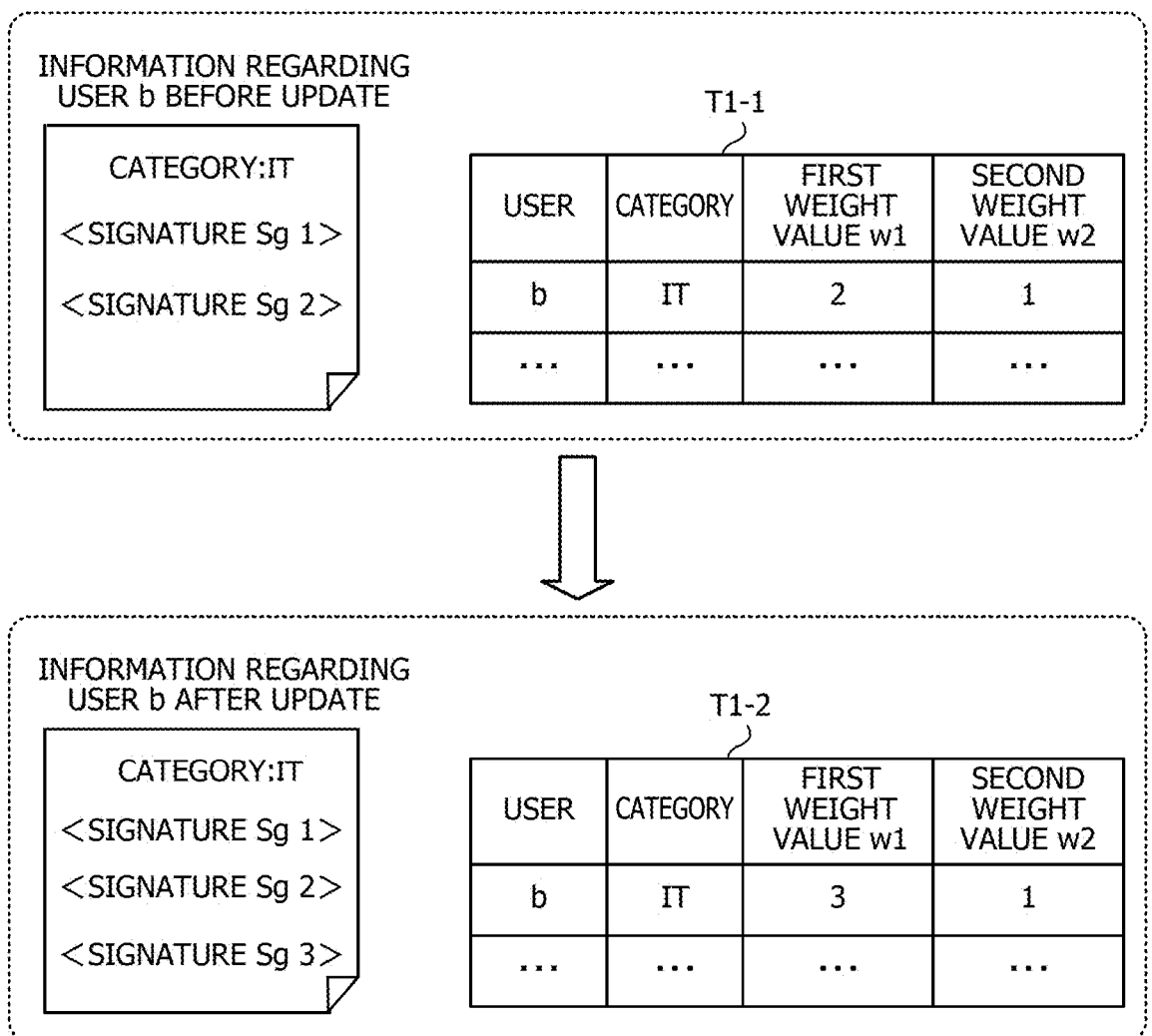
FIG. 15 is a diagram for explaining an example of a state where the first weight value is updated.

FIG. 15 is a diagram for explaining an example of a state where the first weight value is updated.

In information regarding the user b before the first weight value w1 is updated, a record of giving endorsement data to a fact-checked Web article of which a category is IT is written, and the digital signatures Sg1 and Sg2 are given. It is assumed that, in a weighting table T1-1 at this time, the first weight value w1 corresponding to the user b and the category IT be two.

In a case where endorsement data is newly given to a fact-checked Web article of which a category is IT, as information regarding the user b after the first weight value w1 is updated, a digital signature Sg3 is further given as a record. In this case, as indicated in a weighting table T1-2, the first weight value w1 corresponding to the user b and the category IT is updated from two to three.

In this way, the control unit 11 gives a digital signature (specific digital signature) to an additional information issuing user (user b in this example) who has issued endorsement data to a fact-checked Web article.

Then, the control unit 11 updates the first weight value w1 corresponding to identification information of the additional information issuing user and a predetermined category of the Web article, registered in the weighting table T1, based on the number of digital signatures.

As a result, since it is possible to reflect a difference in the reliability between the empathy given by the user having the specific digital signature and the empathy given by the user who does not have the specific digital signature, to the Web article in the same category, on the calculation of the evaluation value, it is possible to enhance the accuracy of the evaluation value indicating the reliability.

Operation from Search for Web Article to Display of Search Result

Figure 16:
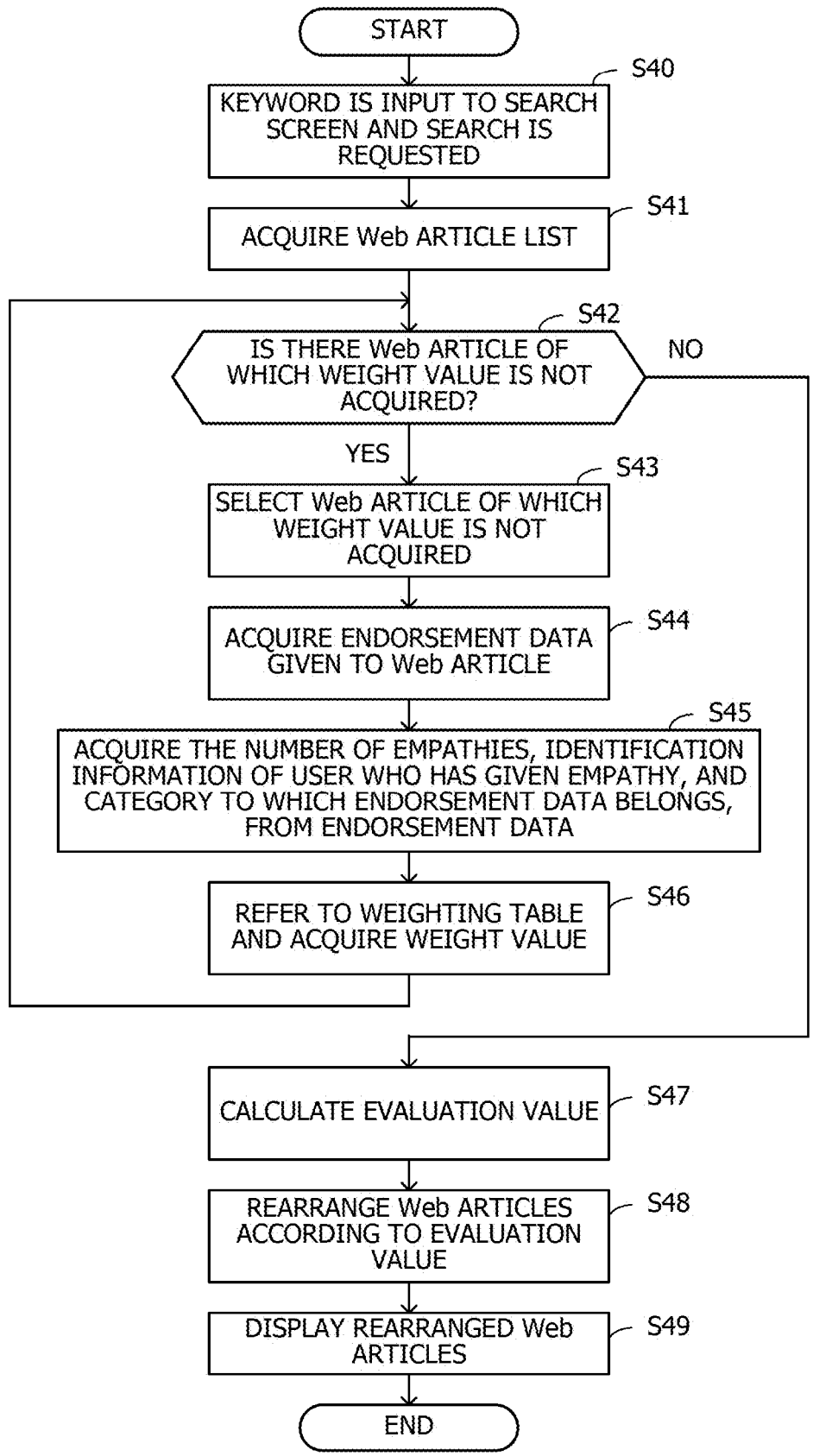
FIG. 16 is a flowchart illustrating an example of an operation from a search for the Web article to display of a search result.

FIG. 16 is a flowchart illustrating an example of an operation from a search for a Web article to display of a search result.

[Step S40] A keyword is input to a search screen by the user, and a search is requested.

[Step S41] The search result list acquisition unit 11a performs the search using the keyword and acquires a list of Web articles (Web article list) obtained by the search.

[Step S42] The search result list acquisition unit 11a determines whether or not there is a Web article of which a weight value is not acquired, in the Web article list. In a case where there is the Web article of which the weight value is not acquired, the procedure proceeds to processing in step S43, and in a case where there is no Web article, the procedure proceeds to processing in step S47.

[Step S43] The endorsement graph acquisition unit 11b selects the Web article of which the weight value is not acquired.

[Step S44] The endorsement graph acquisition unit 11b acquires endorsement data given to the selected Web article, from the endorsement graph management unit 11c.

[Step S45] The evaluation value calculation unit 11e acquires the number of empathies (the number of "likes"), identification information of a user who has given the empathy, and an attribute of a category of the Web article to which the endorsement data belongs, for the endorsement data acquired from the endorsement graph management unit 11c.

[Step S46] The evaluation value calculation unit 11e refers to the weighting table T1 and acquires the first weight value w1 and the second weight value w2, using the user (identification information) who has given the empathy and the category to which the endorsement data belongs as keys. The procedure returns to the processing in step S42.

[Step S47] The evaluation value calculation unit 11e weights the acquired number of empathies of the endorsement data and calculates an evaluation value for each Web article, based on the first weight value w1 and the second weight value w2.

[Step S48] The search result sorting unit 11f rearranges the Web articles included in the Web article list, in descending order of the reliability of the article content of the Web article according to the evaluation value.

[Step S49] The search result display unit 11g displays the Web article list including the rearranged Web articles on the screen, as a search result.

Note that, in the information processing system 1 illustrated in FIG. 5, in a case where the search keyword is input to the server device 10a and the above processing is executed by the server device 10a, for example, the rearranged Web articles are displayed on the screen of the server device 10a. Furthermore, in a case where the search keyword is input to the client device 10b and the above processing is executed by the server device 10a, for example, the rearranged Web articles are displayed on the screen of the client device 10b.

Operation of Acquiring Attribute from Endorsement Data

Figure 17:
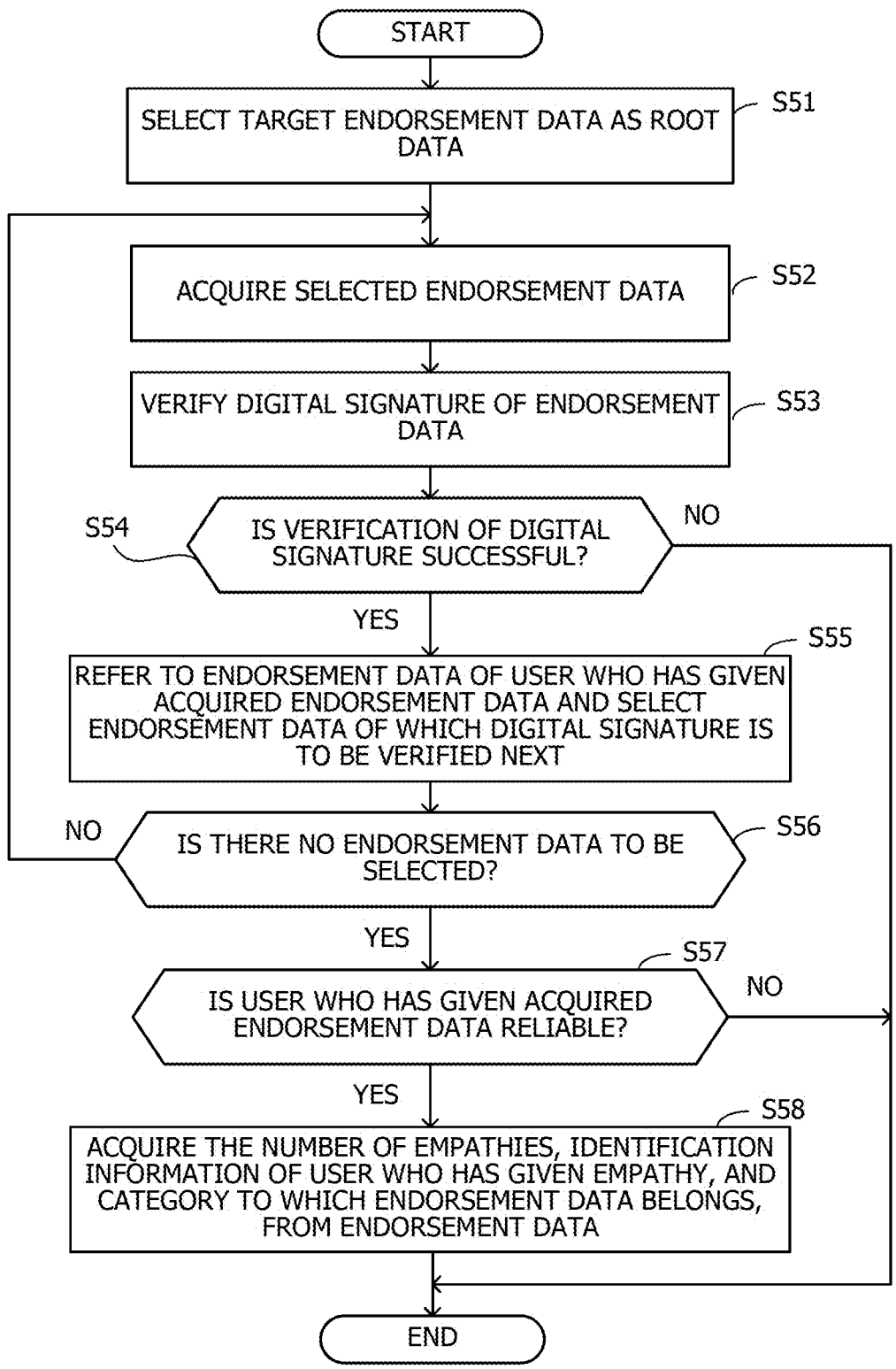
FIG. 17 is a flowchart illustrating an example of an operation in a case where an attribute is acquired from the endorsement data.

FIG. 17 is a flowchart illustrating an example of an operation in a case where the attribute is acquired from the endorsement data. FIG. 17 is a flowchart illustrating a detailed operation in step S45 in FIG. 16.

[Step S51] The evaluation value calculation unit 11e selects target endorsement data as root data. This is selecting the target endorsement data as endorsement data serving as a starting point, and the endorsement data serving as the starting point corresponds to, for example, the endorsement data ED44 in FIG. 4.

[Step S52] The evaluation value calculation unit 11e acquires the selected endorsement data.

[Step S53] The evaluation value calculation unit 11e verifies a digital signature of the acquired endorsement data.

[Step S54] In a case where the verification of the digital signature is successful, the procedure proceeds to processing in step S55, and in a case where the verification is unsuccessful, the processing ends.

[Step S55] The evaluation value calculation unit 11e refers to endorsement data of a user who has given the endorsement data (data of endorser), from the acquired endorsement data and selects endorsement data to be digitally verified next. That is, endorsement data that is traceable next from the acquired endorsement data is selected.

[Step S56] The evaluation value calculation unit 11e determines whether or not there is endorsement data to be selected. In a case where there is no endorsement data to be selected (in a case where there is no endorsement data to be traced next), the procedure proceeds to processing in step S57, and in a case where there is the endorsement data to be selected, the procedure returns to the processing in step S52.

[Step S57] The evaluation value calculation unit 11e determines whether or not the user who has given the acquired endorsement data (endorsement data at finally traced destination) is reliable. In a case where the user is reliable, the procedure proceeds to processing in step S58, and in a case where the user is not reliable, the processing ends.

[Step S58] The evaluation value calculation unit 11e acquires the number of empathies, identification information of the user who has given the empathy, and an attribute of a category to which the endorsement data belongs, for the endorsement data acquired in step S51.

As described above, the evaluation value calculation unit 11e acquires the endorsement data serving as the starting point and traces and verifies whether or not the given endorsement data is reliable by tracing the data of the endorser. Then, as a result of tracing, when the tracing reaches the reliable endorser, it is determined that the data is reliable as a whole, and the attribute is acquired from the endorsement data.

Operation of Setting and Updating First Weight Value

Figure 18:
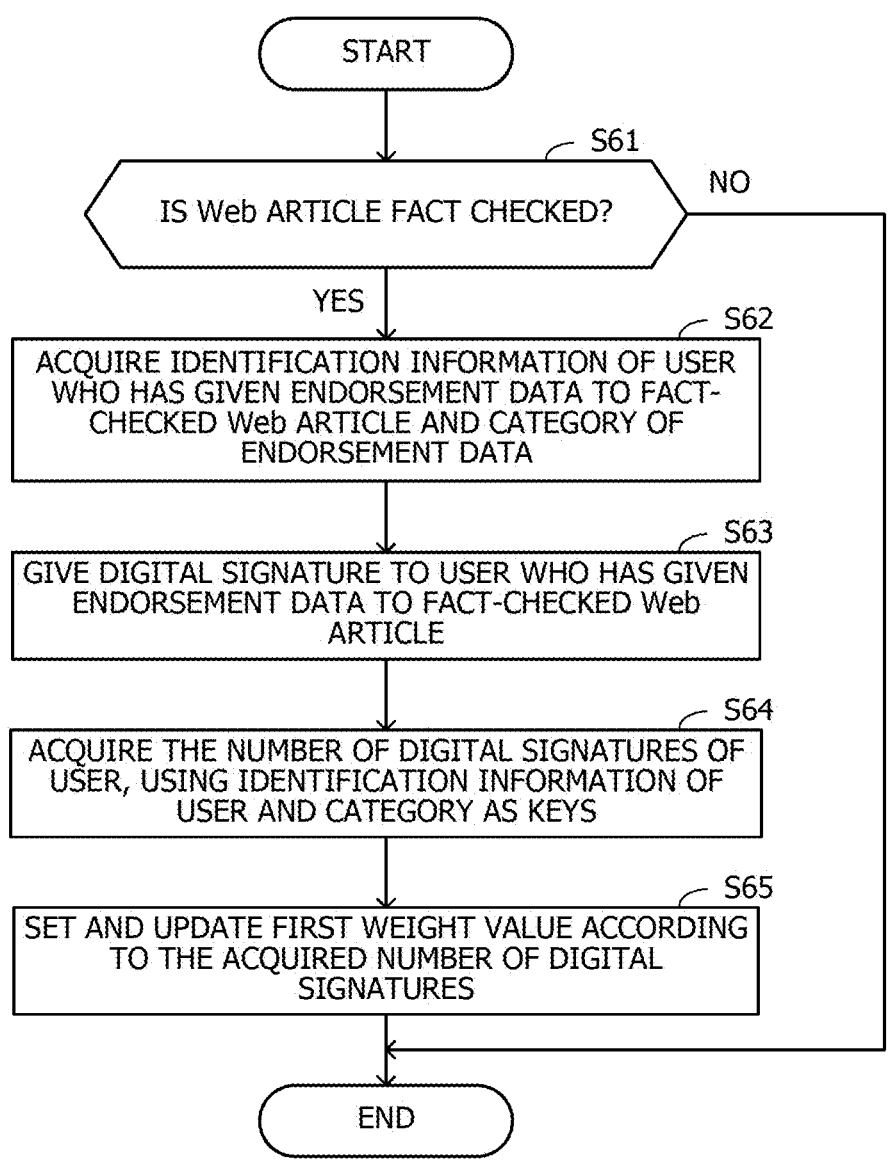
FIG. 18 is a flowchart illustrating an example of an operation of setting and updating the first weight value.

FIG. 18 is a flowchart illustrating an example of an operation of setting and updating the first weight value.

[Step S61] The weight value update unit 11d determines whether or not a Web article is fact checked (content of fact-checked Web article is true). In a case where the Web article is fact checked, the procedure proceeds to processing in step S62, and in a case where fact check is not performed, the processing ends.

[Step S62] The weight value update unit 11d acquires identification information of a user who has given endorsement data to the fact-checked Web article and a category of the endorsement data, from the endorsement graph management unit 11c.

[Step S63] The weight value update unit 11d gives a digital signature to the user who has given the endorsement data to the fact-checked Web article.

[Step S64] The weight value update unit 11d acquires the number of digital signatures of the user, using the identification information of the user and the category as keys.

[Step S65] The weight value update unit 11d sets and updates the first weight value w1 according to the acquired number of digital signatures, using the user identification information and the category as keys, with respect to the weighting table T1.

Steps S62 to S65 described above are executed for each piece of endorsement data given to the fact-checked Web article.

Operation of Setting and Updating Second Weight Value

Figure 19:
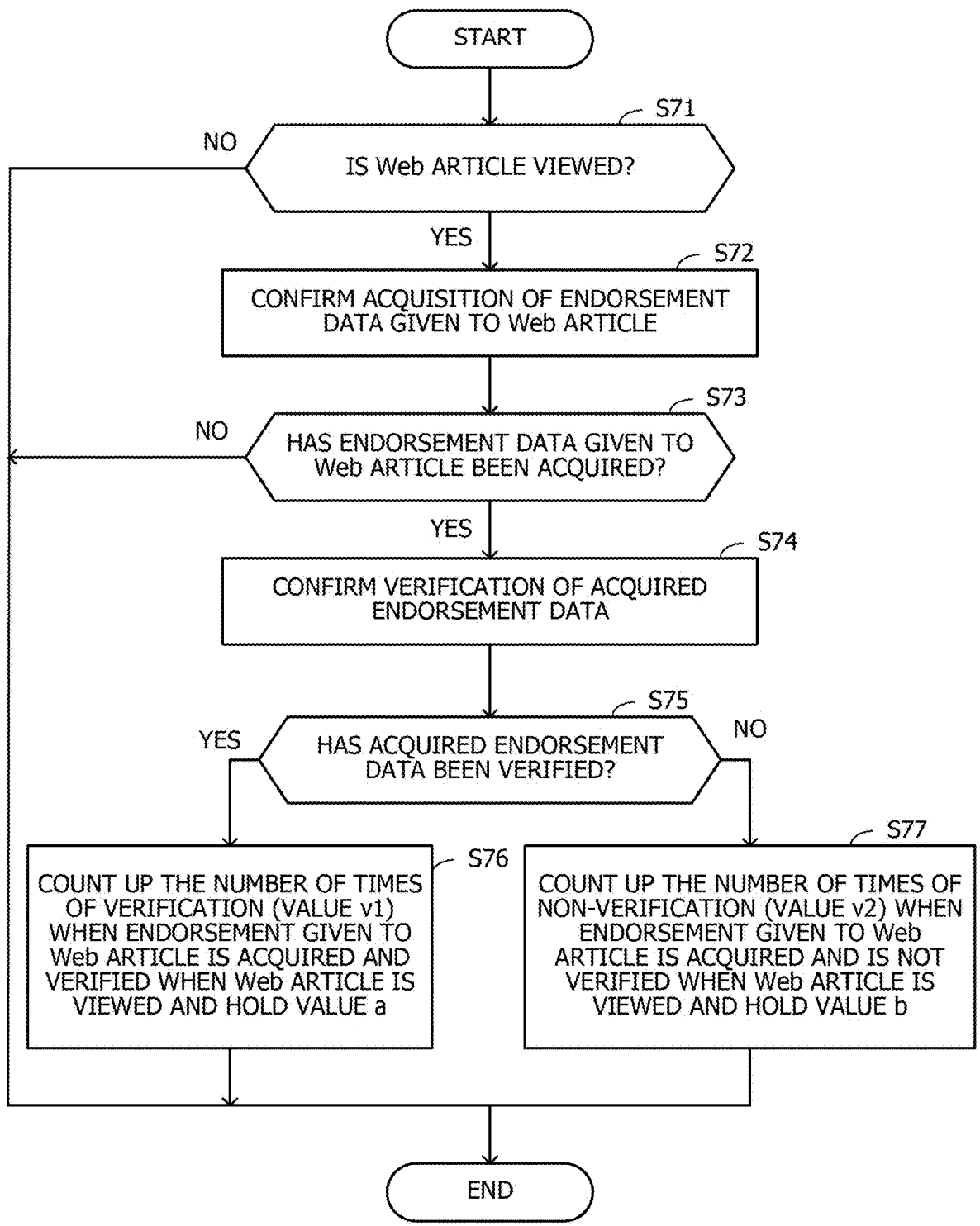
FIG. 19 is a flowchart illustrating an example of an operation in a case where the number of times of verification and the number of times of non-verification are acquired.

FIG. 19 is a flowchart illustrating an example of an operation in a case where the number of times of verification and the number of times of non-verification are acquired. The number of times of verification is the number of times when the endorsement data is verified by the viewer, and the number of times of non-verification is the number of times when the endorsement data is not verified by the viewer.

[Step S71] The weight value update unit 11d determines whether or not the Web article has been viewed. In a case where the Web article has been viewed, the procedure proceeds to processing in step S72, and in a case where the Web article has not been viewed, the processing ends.

[Step S72] The endorsement graph management unit 11c confirms acquisition of the endorsement data given to the Web article, by the viewer of the Web article.

[Step S73] The endorsement graph management unit 11c determines whether or not the viewer has acquired the endorsement data given to the Web article. In a case where the endorsement data is acquired, the procedure proceeds to processing in step S74, and in a case where the endorsement data is not acquired, the processing ends.

[Step S74] The weight value update unit 11d confirms verification of the acquired endorsement data, by the viewer.

[Step S75] The weight value update unit 11d determines whether or not the acquired endorsement data has been verified by the viewer. In a case where the verification of the acquired endorsement data has been performed, the procedure proceeds to processing in step S76, and in a case where the verification is not performed, the procedure proceeds to processing in step S77.

[Step S76] The weight value update unit 11d counts up the number of times of verification (value v1) when the endorsement data given to the Web article is acquired and verified when the Web article is viewed, and holds a value a.

[Step S77] The weight value update unit 11d counts up the number of times of non-verification (value v2) when the endorsement data given to the Web article is acquired and not verified when the Web article is viewed, and holds a value b.

According to the above processing, the number of times of verification (value v1) and the number of times of non-verification (value v2) corresponding to the endorsement data are held.

Figure 20:
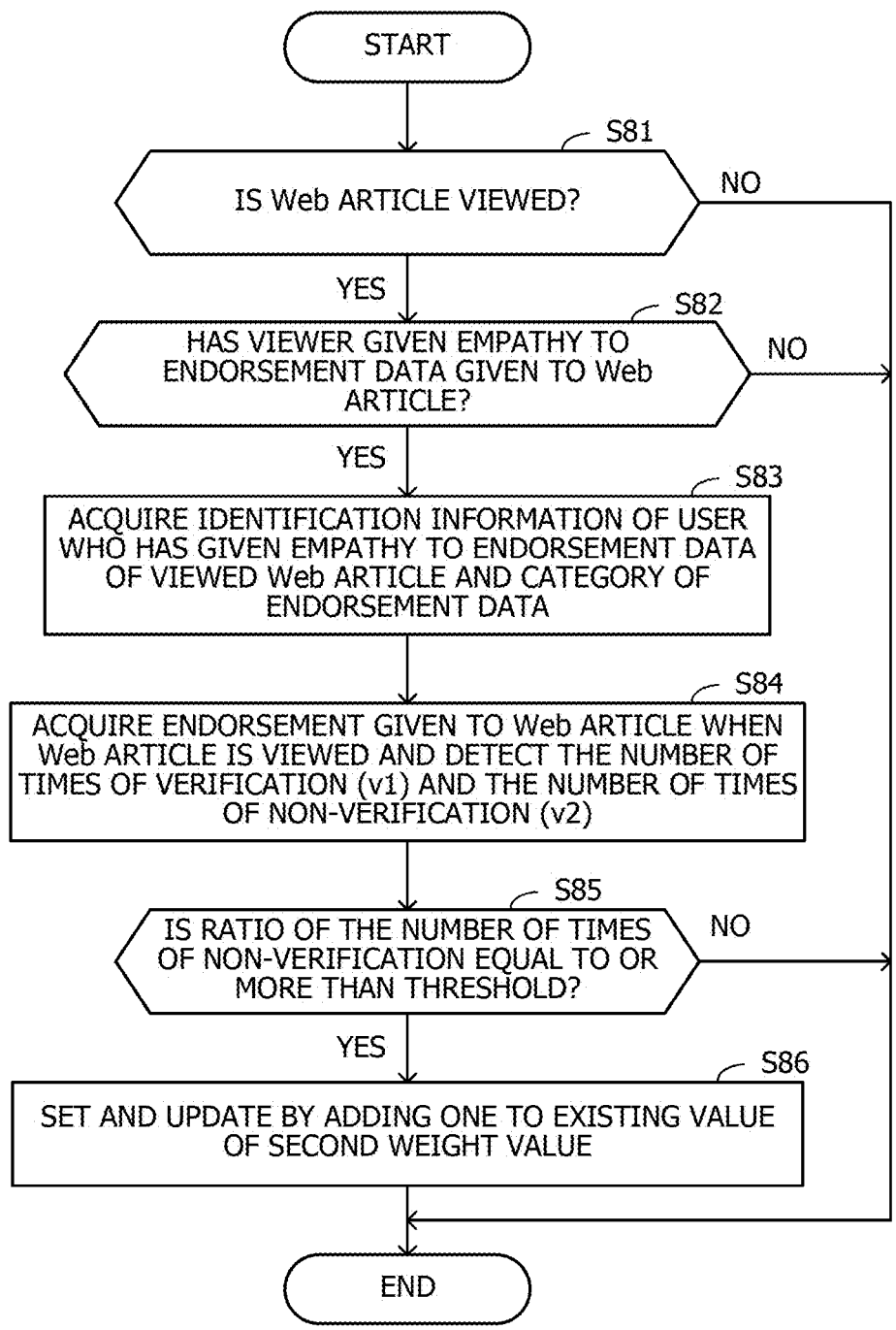
FIG. 20 is a flowchart illustrating an example of an operation of setting and updating a second weight value.

FIG. 20 is a flowchart illustrating an example of an operation of setting and updating the second weight value.

[Step S81] The weight value update unit 11d determines whether or not the Web article has been viewed by a viewer. In a case where the Web article is viewed, the procedure proceeds to processing in step S82, and in a case where the Web article is not viewed, the processing ends.

[Step S82] The weight value update unit 11d determines whether or not the viewer of the Web article has given an empathy to the endorsement data given to the Web article. In a case where the empathy is given, the procedure proceeds to processing in step S83, and in a case where the empathy is not given, the processing ends.

[Step S83] The weight value update unit 11d acquires identification information of the user (viewing user) who has given the empathy to the endorsement data of the viewed Web article and a category of the endorsement data, from the endorsement graph management unit 11c.

[Step S84] The weight value update unit 11d detects the number of times of verification (value v1) and the number of times of non-verification (value v2) corresponding to the endorsement data, to which the empathy is given, given to the Web article, when the Web article is viewed by the viewing user.

[Step S85] The weight value update unit 11d calculates a ratio of the number of times of non-verification according to v2/(v1+v2), to the value v1 that is the number of times of verification and the value v2 that is the number of times of non-verification and determines whether or not the ratio is equal to or more than a threshold. In a case where the ratio is equal to or more than the threshold, the procedure proceeds to the processing in step S86, and in a case where the ratio is less than the threshold, the processing ends.

[Step S86] The weight value update unit 11d sets and updates a value obtained by adding one to an existing value of the second weight value w2, using the identification information of the viewing user and the category as keys, with respect to the weighting table T1.

In this way, in a case where the Web article is viewed and the empathy is given to the endorsement data associated with the Web article, the control unit 11 calculates a ratio of the number of times of non-verification when the endorsement data is not verified by the viewer, of the number of times when the endorsement data has been acquired by the viewer so far.

Then, in a case where the ratio is equal to or more than the threshold, the control unit 11 updates the second weight value w2 corresponding to the identification information of the user who has given the endorsement data and the category of the viewed Web article, registered in the weighting table T1.

As a result, since it is possible to enhance the reliability of the empathy so as to reflect on the calculation of the evaluation value, for a person whose ratio of the number of times of non-verification in the endorsement data acquired by the viewing user who has viewed the Web article is equal to or more than the threshold, it is possible to enhance the accuracy of the evaluation value indicating the reliability.

Operation of Acquiring Attribute from Endorsement

Figure 21:
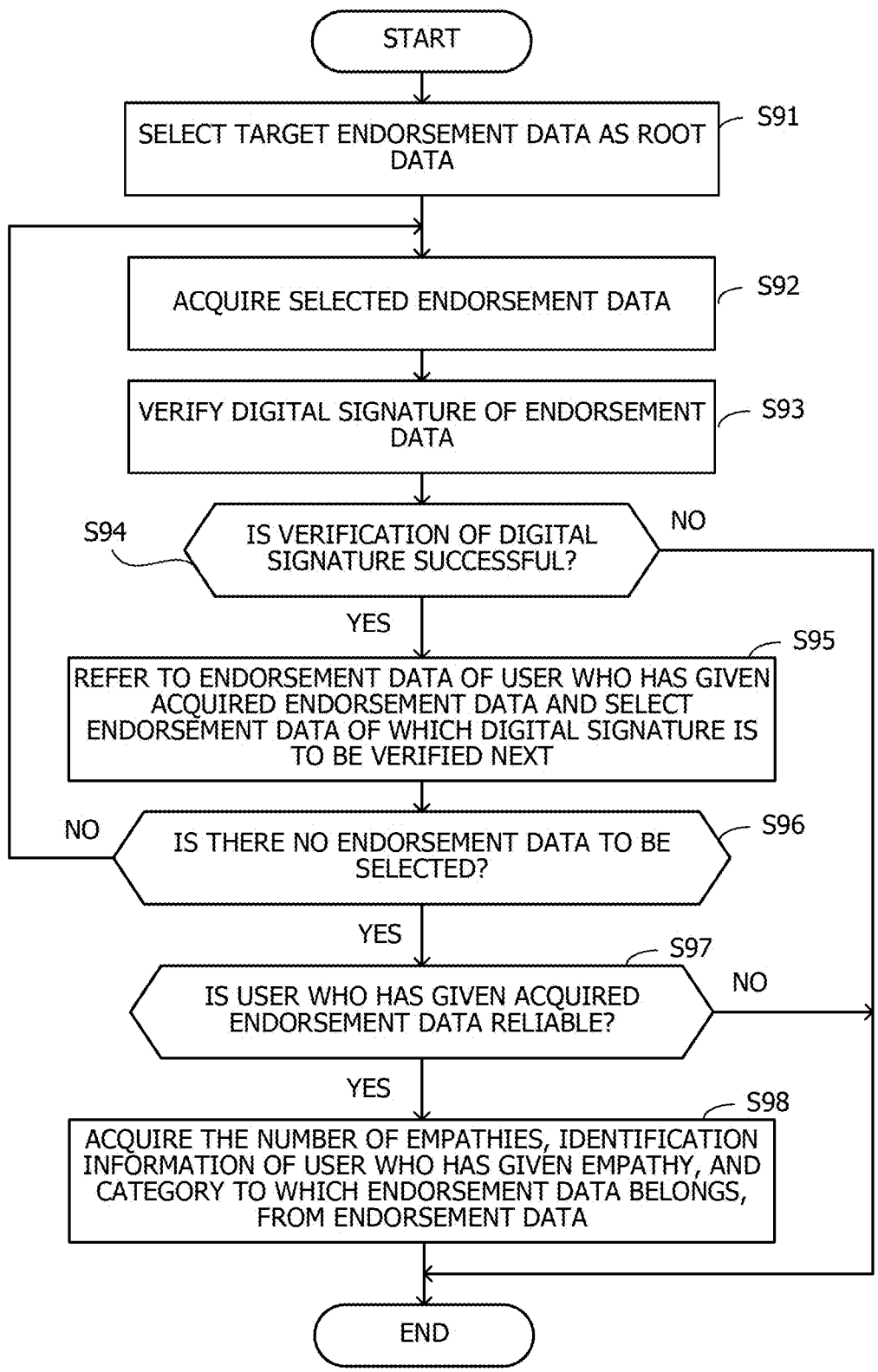
FIG. 21 is a flowchart illustrating an example of an operation in a case where the attribute is acquired from the endorsement data.

FIG. 21 is a flowchart illustrating an example of an operation in a case where the attribute is acquired from the endorsement data. FIG. 21 is a flowchart illustrating a detailed operation in step S62 in FIG. 18 and step S83 in FIG. 20.

[Step S91] The weight value update unit 11d selects the target endorsement data as root data. This is selecting the target endorsement data as endorsement data serving as a starting point, and the endorsement data serving as the starting point corresponds to, for example, the endorsement data ED44 in FIG. 4.

[Step S92] The weight value update unit 11d acquires the selected endorsement data.

[Step S93] The weight value update unit 11d verifies a digital signature of the acquired endorsement data.

[Step S94] In a case where the verification of the digital signature is successful, the procedure proceeds to processing in step S95, and in a case where the verification is unsuccessful, the processing ends.

[Step S95] The weight value update unit 11d refers to endorsement data of a user who has given the endorsement data (data of endorser), from the acquired endorsement data and selects endorsement data to be digitally verified next. That is, endorsement data that is traceable next from the acquired endorsement data is selected.

[Step S96] The weight value update unit 11d determines whether or not there is endorsement data to be selected. In a case where there is no endorsement data to be selected (in a case where there is no endorsement data to be traced next), the procedure proceeds to processing in step S97, and in a case where there is the endorsement data to be selected, the procedure returns to the processing in step S92.

[Step S97] The weight value update unit 11d determines whether or not the user who has given the acquired endorsement data (endorsement data at finally traced destination) is reliable. In a case where the user is reliable, the procedure proceeds to processing in step S98, and in a case where the user is not reliable, the processing ends.

[Step S98] The weight value update unit 11d acquires the number of empathies, identification information of the user who has given the empathy, and an attribute of a category to which the endorsement data belongs, for the endorsement data acquired in step S91.

As described above, the weight value update unit 11d acquires the endorsement data serving as the starting point and traces the data of the endorser so as to verify whether or not the given endorsement data is reliable. Then, as a result of tracing, when the tracing reaches the reliable endorser, it is determined that the data is reliable as a whole, and the attribute is acquired from the endorsement data.

Modification of Setting and Updating First Weight Value

Figure 22:
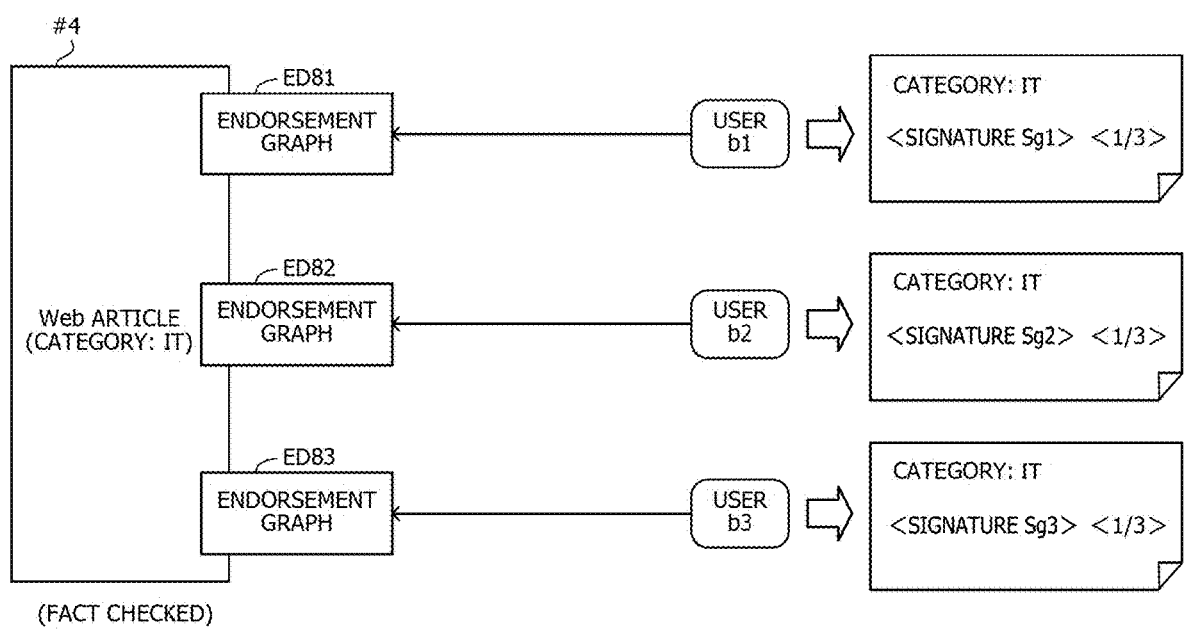
FIG. 22 is a diagram for explaining an example of the update of the first weight value.

Next, a modification of setting and updating the first weight value will be described with reference to FIGS. 22 and 23. FIG. 22 is a diagram for explaining an example of the update of the first weight value. A Web article #4 is a Web article fact checked by a fact check executor, and its category is IT.

To the Web article #4 of which the category is IT, pieces of endorsement data ED81 to ED83 are respectively given by users b1 to b3. In this state, fact check of the Web article #4 is performed.

In a case where content of the Web article #4 is determined as true through fact check, the control unit 11 gives the digital signatures (specific digital signature) Sg1, Sg2, and Sg3 respectively to the users b1, b2, and b3 who have given the pieces of endorsement data ED81, ED82, and ED83 to the Web article #4, respectively.

Here, in the update of the first weight value w1 described with reference to FIGS. 13 to 15, the number of digital signatures given to the user is the first weight value w1. However, in the modification, the number of given digital signatures is divided by the number of pieces of endorsement data given to the Web articles in the single category, and the divided value (may be referred to as normalized weight value) is added to the first weight value w1 so as to update the first weight value w1.

In the example in FIG. 22, to the fact-checked Web article #4 of which the category is IT, the three pieces of endorsement data ED81, ED82, and ED83 are given. Therefore, a divided value ⅓ obtained by dividing one that is the number of digital signatures Sg1 given to the user b1 by three is a normalized weight value used to update the first weight value w1 of the user b1.

Similarly, a divided value ⅓ obtained by dividing one that is the number of digital signatures Sg2 given to the user b2 by three is a normalized weight value used to update the first weight value w1 of the user b2. Moreover, a divided value ⅓ obtained by dividing one that is the number of digital signatures Sg3 given to the user b3 by three is a normalized weight value used to update the first weight value w1 of the user b3.

Figure 23:
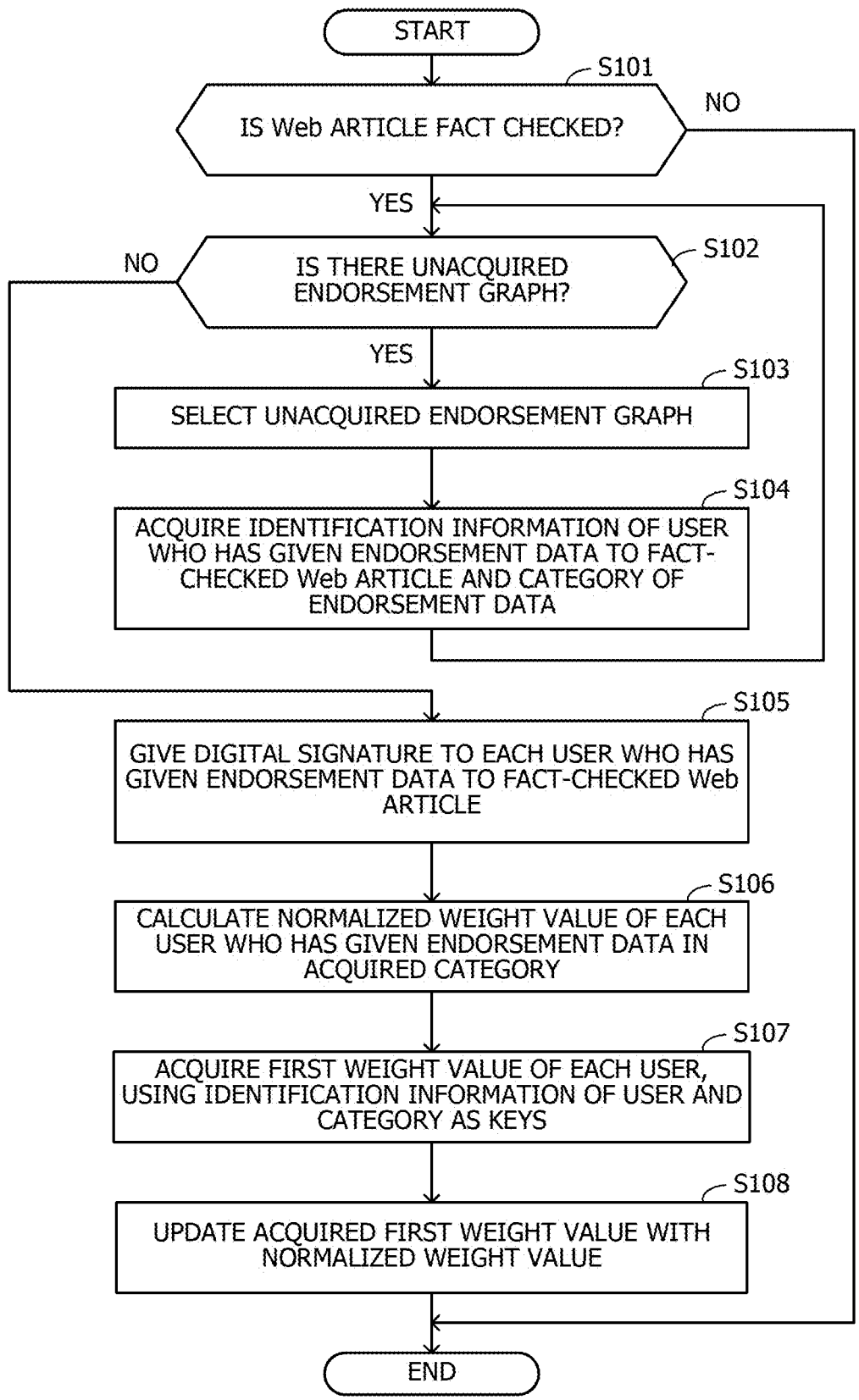
FIG. 23 is a flowchart illustrating an example of the operation of setting and updating the first weight value.

FIG. 23 is a flowchart illustrating an example of an operation of setting and updating the first weight value.

[Step S101] The weight value update unit 11d determines whether or not a Web article is fact checked (content of fact-checked Web article is true). In a case where the Web article is fact checked, the procedure proceeds to processing in step S102, and in a case where fact check is not performed, the processing ends.

[Step S102] The weight value update unit 11d determines whether or not there is an unacquired endorsement graph. In a case where there is an unacquired endorsement graph, the procedure proceeds to processing in step S103, and in a case where there is no unacquired endorsement graph, the procedure proceeds to processing in step S105.

[Step S103] The weight value update unit 11d acquires the unacquired endorsement graph.

[Step S104] The weight value update unit 11d acquires identification information of a user who has given the acquired endorsement data and a category of the endorsement data (same as category of Web article), from the endorsement graph management unit 11c.

[Step S105] The weight value update unit 11d gives a digital signature to be a testament that the endorsement data has been given to the fact-checked article, to each user who has given the endorsement data to the fact-checked Web article having the acquired category.

[Step S106] The weight value update unit 11d calculates a normalized weight value of each user who has given the endorsement data to the fact-checked Web article having the acquired category.

[Step S107] The weight value update unit 11d acquires the first weight value w1 currently registered for each user, using the identification information and the category as keys.

[Step S108] The weight value update unit 11d adds the normalized weight value to the acquired first weight value w1 and sets and updates the first weight value w1.

In this way, each of the plurality of additional information issuing users (users b1, b2, and b3) issues the endorsement data to the fact-checked Web article in the predetermined category. In this case, the control unit 11 gives each of the specific digital signatures (Sg1, Sg2, and Sg3) indicating that the endorsement data has been issued to the fact-checked Web article.

Furthermore, the control unit 11 updates the first weight value w1 corresponding to the identification information of the additional information issuing user and the predetermined category of the Web article, registered in the weighting table T1, based on a value obtained by dividing the number of specific digital signatures given to each additional information issuing user by the total number of the plurality of pieces of endorsement data.

As a result, by dividing the number of empathies of empathy given by the user having the specific digital signature by the number of pieces of endorsement data given to the Web article in the same category, the reliability of each user to whom the digital signature is given can be normalized and reflected on the calculation of the evaluation value. Therefore, it is possible to enhance the accuracy of the evaluation value indicating the reliability.

The information processing apparatus and the information processing system according to the embodiment described above can be implemented by a computer. In this case, a program is provided in which processing content of the functions to be included in the information processing apparatus and the information processing system is written. The program is executed in the computer, whereby the processing functions described above are implemented in the computer.

The program describing the processing contents can be recorded in a computer-readable recording medium. Examples of the computer-readable recording medium include a magnetic storage unit, an optical disk, a magneto-optical recording medium, a semiconductor memory, and the like. Examples of the magnetic storage unit include a hard disk drive (HDD), a flexible disk (FD), a magnetic tape, and the like. Examples of the optical disk include a CD-ROM/RW and the like. Examples of the magneto-optical recording medium include a magneto optical (MO) disk and the like.

In a case of distributing the program, for example, portable recording media such as CD-ROMs in which the program is recorded are sold. Alternatively, it is possible to store the program in a storage unit of a server computer and transfer the program from the server computer to another computer via a network.

The computer which executes the program stores, for example, the program recorded in the portable recording medium or the program transferred from the server computer in a storage unit of the computer itself. Then, the computer reads the program from its own storage unit and executes processing in accordance with the program. Note that, the computer can also read the program directly from the portable recording medium and execute processing according to the program.

In addition, the computer can also successively execute processing in accordance with the received program each time the program is transferred from the server computer coupled via the network. Furthermore, at least a part of the processing functions described above may be implemented by an electronic circuit such as a DSP, an ASIC, or a PLD.

While the embodiments have been exemplified thus far, the configuration of each unit illustrated in the embodiment may be replaced with another configuration having a similar function. Furthermore, other optional components and steps may be added. Moreover, any two or more components (features) of the embodiment described above may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute a process comprising:
   acquiring additional information capable of verifying reliability of a plurality of first Web articles;
   detecting a plurality of empathies that indicates a number of empathies given to the additional information included in an additional information group, for the plurality of first Web articles to which the additional information group associated with a plurality of pieces of the additional information is given when the additional information is regarded as valid for verification of the reliability;
   calculating an evaluation value of reliability of the plurality of first Web articles from the number of empathies and orders the plurality of first Web articles based on the evaluation value; and
   ordering the plurality of first Web articles based on the evaluation value, wherein the process
   causes the additional information of each of a plurality of second Web articles to be searched, that includes the plurality of first Web articles, to have a category of the plurality of second Web articles as an attribute,
   generates and manages a weighting table in which identification information of a user who has given an empathy among the plurality of empathies, the category, and a corresponding weight value that includes a first weight value and a second weight value are associated, and
   in a case where the empathy is given to the additional information with the attribute of the category registered in the weighting table, by the user with the identification information registered in the weighting table, weights the number of empathies of given empathies with the corresponding weight value and calculates the evaluation value.

2. The non-transitory computer-readable recording medium according to claim 1, wherein
   the process
   gives a digital signature among digital signatures to an additional information issuing user who has issued the additional information to a fact-checked third Web article of which article content is fact checked and determined as true and the article content is in a predetermined category, among the plurality of second Web articles, and
   updates the first weight value that corresponds to the identification information of the additional information issuing user and the predetermined category of the fact-checked third Web article, based on a number of the digital signatures.

3. The non-transitory computer-readable recording medium according to claim 1, wherein
   the process
   in a case where a fourth Web article is viewed by a viewing user, among the plurality of second Web articles and it is detected that the empathy is given to the additional information associated with the fourth Web article, calculates a ratio of a number of times of non-verification when the additional information is not verified by the viewing user, within a number of times when the additional information is acquired by the viewing user, and
   in a case where it is detected that the ratio is equal to or more than a threshold, updates the second weight value that corresponds to the identification information of the viewing user and the category of the fourth Web article viewed, registered in the weighting table.

4. The non-transitory computer-readable recording medium according to claim 1, wherein
   the process
   gives a digital signature to each of a plurality of additional information issuing users who has respectively issued a plurality of pieces of first additional information to a fact-checked third Web article of which article content is fact checked and determined as true, and the article content is in a predetermined category, among the plurality of second Web articles; and
   updates the first weight value that corresponds to the identification information of the plurality of additional information issuing users and the predetermined category of the fact-checked third Web article, based on a value obtained by dividing a number of digital signatures given to each of the plurality of additional information issuing users by a total number of the plurality of pieces of first additional information.

5. The non-transitory computer-readable recording medium according to claim 1, wherein
   the process transmits the plurality of first Web articles ordered to a client device that receives an input keyword and outputs a search result.

6. An information processing apparatus comprising:
   a memory; and a processor coupled to the memory and configured to:
acquire additional information capable of verifying reliability of a plurality of first Web articles;
detect a plurality of empathies that indicates a number of empathies given to the additional information included in an additional information group, for the plurality of first Web articles to which the additional information group associated with a plurality of pieces of the additional information is given when the additional information is regarded as valid for verification of the reliability;
calculate an evaluation value of reliability of the plurality of first Web articles from the number of empathies and orders the plurality of first Web articles based on the evaluation value; and
order the plurality of first Web articles based on the evaluation value, wherein the processor
causes the additional information of each of a plurality of second Web articles to be searched, that includes the plurality of first Web articles, to have a category of the plurality of second Web articles as an attribute,
generates and manages a weighting table in which identification information of a user who has given an empathy among the plurality of empathies, the category, and a corresponding weight value that includes a first weight value and a second weight value are associated, and
in a case where the empathy is given to the additional information with the attribute of the category registered in the weighting table, by the user with the identification information registered in the weighting table, weights the number of empathies of given empathies with the corresponding weight value and calculates the evaluation value.

7. An information processing system comprising:
a client device; and
a server device configured to:
acquire additional information capable of verifying reliability of a plurality of first Web articles;
detect a plurality of empathies that indicates a number of empathies given to the additional information included in an additional information group, for the plurality of first Web articles to which the additional information group associated with a plurality of pieces of the additional information is given when the additional information is regarded as valid for verification of the reliability;
calculate an evaluation value of reliability of the plurality of first Web articles from the number of empathies and orders the plurality of first Web articles based on the evaluation value; and
order the plurality of first Web articles based on the evaluation value, and transmit the plurality of first Web articles ordered to the client device as a search result,
wherein the server device is configured to
cause the additional information of each of a plurality of second Web articles to be searched, that includes the plurality of first Web articles, to have a category of the plurality of second Web articles as an attribute,
generate and manage a weighting table in which identification information of a user who has given an empathy among the plurality of empathies, the category, and a corresponding weight value that includes a first weight value and a second weight value are associated, and
in a case where the empathy is given to the additional information with the attribute of the category registered in the weighting table, by the user with the identification information registered in the weighting table, weigh the number of empathies of given empathies with the corresponding weight value and calculates the evaluation value.

\* \* \* \* \*